United States Patent [19]

Friedman et al.

[11] Patent Number: 4,989,139
[45] Date of Patent: Jan. 29, 1991

[54] MAP CASE NETWORK VIRTUAL CONNECTION INTERFACE SYSTEM

[75] Inventors: Robert M. Friedman, Los Altos, Calif.; Grayson W. Randall, Vestal, N.Y.; Richard J. Sheftic; David P. Spencer, both of Endwell, N.Y.

[73] Assignee: International Business Machines Corporation, Armonk, N.Y.

[21] Appl. No.: 467,333

[22] Filed: Jan. 19, 1990

Related U.S. Application Data

[63] Continuation of Ser. No. 75,004, Jul. 17, 1987, abandoned.

[51] Int. Cl.$^5$ .................... G06F 13/00; G06F 15/16
[52] U.S. Cl. ................. 364/200; 364/900; 364/927.96; 364/940.81; 364/974.2; 364/978; 364/940.61; 364/228.2; 364/232.1; 364/240.8; 364/242.94; 364/284.4
[58] Field of Search ... 364/200 MS File, 900 MS File, 364/300; 370/60; 340/825.059, 825.06

[56] References Cited

U.S. PATENT DOCUMENTS

| | | | |
|---|---|---|---|
| 3,970,992 | 7/1976 | Boothroyd et al. | 364/900 |
| 4,058,672 | 11/1977 | Crager et al. | 370/60 |
| 4,219,873 | 8/1980 | Kober et al. | 364/200 |
| 4,456,970 | 6/1984 | Catiller et al. | 364/900 |
| 4,513,373 | 4/1985 | Sheets | 364/200 |
| 4,516,205 | 5/1985 | Einga et al. | 364/200 |
| 4,523,272 | 6/1985 | Fukunaga et al. | 364/200 |
| 4,604,686 | 8/1986 | Reiter et al. | 364/200 |
| 4,639,889 | 1/1987 | Matsumoto et al. | 364/900 |
| 4,667,287 | 5/1987 | Allen et al. | 364/200 |
| 4,677,588 | 6/1987 | Benjamin et al. | 364/900 |
| 4,754,395 | 6/1988 | Weisshaar et al. | 364/200 |
| 4,771,391 | 9/1988 | Blasbalg | 364/200 |

OTHER PUBLICATIONS

"Local network gives new flexibility to distributed processing" by Bass et al., Sep. 25, 1980.

Primary Examiner—Michael R. Fleming
Assistant Examiner—Gopal C. Ray
Attorney, Agent, or Firm—Douglas M. Clarkson

[57] ABSTRACT

The disclosure describes a system to permit communication between two dissimilar networks that involves an interface system. More particularly, it is an interface system to permit communication between a MAP network that is utilizing common application service elements (CASE) and a network of non-MAP computer equipment. The interface system that is described establishes a connection between the two networks which involves a process of decoding data from one network into predetermined component parts, and then encoding the component parts into data for transfer to computer equipment in the other network, and then, releasing the connection when the data transfer is completed, in accordance with the State Table of FIG. 3 of the drawings.

2 Claims, 8 Drawing Sheets

FIG. 3A

Network B Application Registration States

1 - Not Registered with MAP Service Provider
2 - Waiting for Register Request status from MAP Service Provider
3 - Waiting for Deregister Request status from MAP Service Provider
4 - Registered with MAP Service Provider Virtual MAP CASE Connection States 1 - Disconnected
2 - Waiting for Associate.request request status from the MAP Network Service Provider
3 - Waiting for Associate.response request status from the MAP Network Service Provider (accepting connection)
4 - Waiting for Associate.response request status from the MAP Network Service Provider (rejecting connection)
5 - Waiting for Associate.confirm transaction from the MAP Network Service Provider
6 - Waiting for U_Connect.response transaction from the Network B Service Provider
7 - Connected
8 - Waiting for Release.request request status from the MAP Network Service Provider
9 - Waiting for Release.response request status from the MAP Network Service Provider
10 - Waiting for Release.confirm transaction from the MAP Network Service Provider
11 - Waiting for U_Release.response transaction from the Network B Service Provider Action Codes A - Send a U_Abort.request transaction to the MAP Service Provider
B - Build a new table entry
D - Delete table entry
E - Build a U_Error.indication transaction and send it to the Network B Service Provider
H - Build State Sensitive Transaction and send it to the Network B Service Provider
L - Build State Sensitive Transaction and send it to the MAP Network Service Provider
M - Illegal condition, log error message
N - No action
R - Reference Network B Application Program Registration State table Notes:

1. Each column in the table shows the action and state transition (if any)
2. All U_XXXXreq and U_XXXXresp transactions are from the Network B Service Provider
3. All A_XXXXreq and A_XXXXresp transactions are returned status from the MAP Network Service Provider.
4. All A_XXXXind and A_XXXXconf transactions are from the MAP Network Service Provider and are bound for the Network B Service Provider
5. The notations (a) and (r) indicate whether the connection is being accepted (a) or rejected (r)
6. The notations (s) and (u) indicate the returned status information from the MAP Network Service Provider and indicate whether the MAP Service request was successfully (s) or unsuccessfully (u) processed by the MAP Service Provider

FIG. 3C

MAP CASE NETWORK VIRTUAL CONNECTION INTERFACE SYSTEM

This application is a continuation of application Ser. No. 075,004, filed 07/17/87, now abandoned.

BACKGROUND OF THE INVENTION

The invention, generally, relates to systems for interconnecting computers electronically for the purpose of information exchange and, more particularly, to a new and improved system to permit communication between a Manufacturing Automation Protocol (MAP) network utilizing the Common Application Service Elements (CASE) hereinafter referred to as a MAP CASE network, and a non-MAP connection-oriented network.

Earlier this decade, a major manufacturer of automobiles in the United States found that a significant percentage of the cost of automating its factories was related to developing ways to provide interconnections between equipment made by different vendors. Actually, there are a large number of vendors who make and sell data processing computers specifically for the factory environment, and while these vendors usually also make and sell interconnecting devices for their equipment, such interconnecting devices will typically operate only with the equipment sold by each vendor.

To a large device, this situation has been responsible for the emergence of "islands of automation", which are localized areas of automation on the factory floor that are isolated from other areas of the factory in terms of electronic exchange of information. This lack of electronic exchange of information between various vendor's equipment is a major roadblock to achieving total factory automation.

The Local Area Network, or LAN, technology that is commonly used in offices is not suitable for a factory environment where machines generate spurious electronic signals that interfere with computer operations. Therefore, a network standard was developed, called Manufacturing Automation Procol, or MAP, that is suitable for use with computer equipment of many types and origins in the factory environment.

It is expected that as the Manufacturing Automation Protocol technology matures, it will receive wide acceptance throughout the industry for application in newly designed and installed manufacturing systems. However, because the MAP network specification is still relatively new and still evolving, data processing computer interfaces to the MAP network are still relatively expensive when compared to similar data processing computer network interfaces for many previously defined networks. Further, there are a number of pre-MAP connection-oriented networks already installed and operational. Owners of such networks are reluctant to remove these networks in order to install new MAP networks.

A network which combines the multi-vendor interconnection and factory floor suitability features of the MAP network with the already installed non-MAP connection-oriented network to produce a Virtual MAP network would be highly desirable. Such a Virtual MAP network preserves the integrity and characteristics of the MAP CASE connection from the computer attached to the MAP network to the computer attached to the non-MAP connection oriented network. This is done in such a manner so as to guarantee the end-to-end delivery of data, preserve the MAP CASE connection state information and present it to both ends of the Virtual connection, and reflect the MAP CASE network naming conventions across the Virtual MAP CASE Connection.

The benefits of such a Virtual MAP network include the ability to selectively install the MAP network where needed to interconnect manufacturing equipment from multiple vendors for the purpose of electronic data exchange, while at the same time, utilizing the already installed non-MAP connection-oriented network and associated data processing computers and interfaces to the non-MAP network. In the future, if technical and business reasons dictate, the non-MAP network could be incrementally replaced with the MAP network with a minimum impact on various user programs developed to operate in the Virtual MAP network.

Therefore, to provide this Virtual MAP network, an interface system is needed that will permit any MAP CASE user program running in any data processing computer attached to the MAP CASE network, to establish a MAP CASE connection and exchange data with another MAP CASE user program running in any other data processing computer attached to a non-MAP connection-oriented network.

SUMMARY OF THE INVENTION

A principal object of the present invention is to provide an interface system to permit ready exchange of information between two dissimilar connection-oriented networks.

It is also an object of the present invention to provide a system to function as an electronic system interface between networks having different operating characteristics.

A further object of the invention is to provide a new and improved technique for data processing computers in one network to communicate readily with data processing computers in a MAP network.

Another object of the invention is to provide an interface system to permit data processing computers in a network to communicate with data processing computers in a MAP network while preserving the end-to-end MAP CASE connection characteristics and integrity.

Briefly, a system interface that is connected and arranged according to the principles of the present invention is capable of identifying differences in data conventions used for data in two connection-oriented networks and is capable of managing any path for data that may be required to communicate such data from one network location to another network location. Actually, a system interface that will function in accordance with the invention performs the various and different actions identified categorically in the drawings, as will be explained in more detail hereinafter.

BRIEF DESCRIPTION OF THE DRAWINGS

FIG. 3C shows a list of the respective numbers and letters, with their respective meanings, to identify registration and connection states, and also FIG. 3C shows state transition trigger actions required at any particular state as defined by the State Table of FIGS. 3A and 3B with the meaning identified for each.

DETAILED DESCRIPTION OF THE INVENTION

Figure 3A:
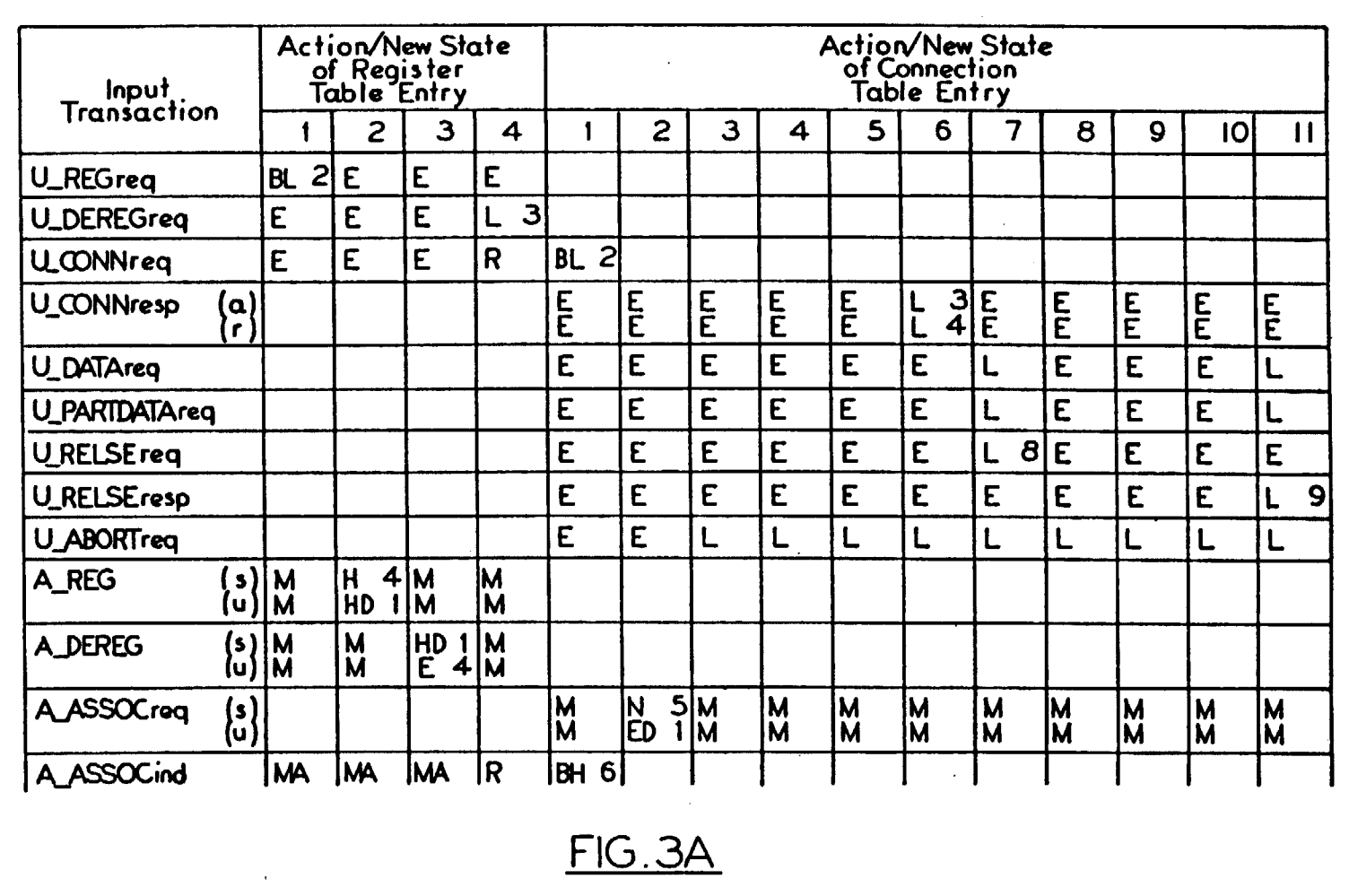
Figures 3, 3B:
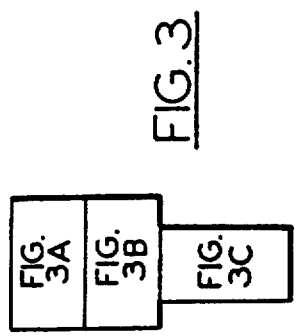
FIG. 3 consists of FIG. 3A, FIG. 3B and FIG. 3C, the FIGS. 3A and 3B show a Registration and Connection State Table, in accordance with the invention, summarizing the actions and the state transitions for any instance of registration management and connection management.

The description presented under the heading "Logic Description" provides an example implementation of the invention as depicted in FIG. 3. This implementation is written in English-like statements, commonly referred to as "pseudo code", to describe the logic of the MAP CASE Network Virtual Connection Interface System of the invention. Further, contained in this "pseudo code" are the detailed state sensitive transaction formats and associated encoding/decoding procedures.

Logic Description

```
/*****************************************************/
/*                                                   */
/*              PSUEDO CODE FOR                      */
/*    MAP CASE NETWORK VIRTUAL CONNECTION INTERFACE SYSTEM  */
/*                                                   */
/*****************************************************/

/*****************************************************/
/*************** DATA FORMATS *********************/
/*****************************************************/

REGISTER_COUNTER      4 BYTES; /* TOTAL REGISTRATIONS. NET MGMT */
CONNECTION_COUNTER    4 BYTES; /* TOTAL CONNECTIONS. NET MGMT */

NETB STATE TABLE
    {
    STATE            1 BYTE; /* SEE STATES DEFINED BELOW */
    NETB PATH ID     2 BYTES;
    NETB NODE NAME   8 CHARS;
    NETB USER NAME   8 CHARS;
    } WITH 65 ENTRIES;

REGISTER STATE TABLE
    {
    STATE            1 BYTE; /* SEE STATES DEFINED BELOW */
    NETB PATH ID     2 BYTES;
    LOCAL NAME LENGTH 1 BYTE;
    LOCAL NAME       64 CHARS;
    CLIENT TAG {
            TABLE INDEX   1 BYTE;   /* STATE TABLE ENTRY      */
            RESERVED      1 BYTE;   /* RESERVED               */
            REG COUNTER   1 BYTE;   /* MAKES ENTRY UNIQUE     */
            REQ_ID        1 BYTE;   /* REQUEST ID IN USER UIDU */
            }
    } WITH 65 ENTRIES;
```

```
CONNECTION STATE TABLE
    (
    STATE                      1 BYTE;    /* SEE STATES DEFINED BELOW  */
    NETB PATH ID               2 BYTES;
    CHANNEL NUMBER             2 BYTES;   /* NEED TO ABORT CONNECTIONS */
    REGISTRATION NAME INDEX    1 BYTE;    /* CONNECTION WITH REG. NAME */
    REMOTE NAME LENGTH         1 BYTE;    /* FOR NETWORK MANAGEMENT    */
    REMOTE NAME               64 CHARS;   /* FOR NETWORK MANAGEMENT    */
    CLIENT TAG (
            TABLE INDEX    1 BYTE;    /* STATE TABLE ENTRY     */
            RESERVED       1 BYTE;    /* RESERVED              */
            CONN COUNTER   1 BYTE;    /* MAKES ENTRY UNIQUE    */
            REQ_ID         1 BYTE;    /* REQUEST ID IN USER UIDU */
            }
    } WITH 65 ENTRIES;

/***********  DEFINE TABLE STATES   ****************************/
/*
**    NETB STATES:
**       1) DISCONNECTED
**       2) CONNECTED
**       3) SEVER PENDING
**
**    REGISTER STATES:
**       1) NOT REGISTERED WITH MAP SERVICE PROVIDER
**       2) WAITING FOR REGISTER REQUEST STATUS FROM MAP SERVICE PROVIDER
**       3) WAITING FOR DEREGISTER REQUEST STATUS FROM MAP SERVICE PROVIDER
**       4) REGISTERED WITH MAP SERVICE PROVIDER
**
**    CONNECTION STATES:
**       1) DISCONNECTED
**       2) WAITING FOR ASSOCIATE.REQUEST REQUEST STATUS
**          FROM THE MAP NETWORK SERVICE PROVIDER
**       3) WAITING FOR ASSOCIATE.RESPONSE REQUEST STATUS
**          FROM THE MAP NETWORK SERVICE PROVIDER (ACCEPTING CONNECTION)
**       4) WAITING FOR ASSOCIATE.RESPONSE REQUEST STATUS
**          FROM THE MAP NETWORK SERVICE PROVIDER (REJECTING CONNECTION)
**       5) WAITING FOR ASSOCIATE.CONFIRM TRANSACTION
**          FROM THE MAP NETWORK SERVICE PROVIDER
**       6) WAITING FOR U_CONNECT.RESPONSE TRANSACTION
**          FROM THE NETWORK B SERVICE PROVIDER
**       7) CONNECTED
**       8) WAITING FOR RELEASE.REQUEST REQUEST STATUS
**          FROM THE MAP NETWORK SERVICE PROVIDER
**       9) WAITING FOR RELEASE.RESPONSE REQUEST STATUS
**          FROM THE MAP NETWORK SERVICE PROVIDER
**      10) WAITING FOR RELEASE.CONFIRM TRANSACTION
**          FROM THE MAP NETWORK SERVICE PROVIDER
**      11) WAITING FOR U_RELEASE.RESPONSE
**          FROM THE NETWORK B SERVICE PROVIDER
**
```

```
/******************************************************************/
/***************** MAIN TASK - MAPSERV ************************/
/******************************************************************/
/*
** THIS ROUTINE WILL GET A PACKET FROM AN INPUT QUEUE, AND WILL
** ROUTE IT TO THE PROPER ROUTINES DEPENDING ON IF IT WAS GENERATED
** FROM THE NETWORK B INTERFACE OR FROM THE MAP LAN.
*/
MAPSERV
   {
   DO FOREVER
      {
      WAIT TO RECEIVE PACKET FROM QUEUE;  /* ALL INPUT IS HERE */
         IF (PACKET SOURCE -- NETWORK B)
            CALL SERVICE_NETB_PACKET;
         ELSE PACKET IS FROM MAP LAN
            CALL SERVICE_MAP_LAN_PACKET;
      }  /* END FOREVER */
   }  /* END MAPSERV */

/******************************************************************/
/********** SERVICE_NETB_PACKET ********************************/
/******************************************************************/
/*
** THIS ROUTINE SPLITS THE NETWORK B PACKETS INTO CONTROL PACKETS AND
** INTO DATA PACKETS THAT ARE TO BE SENT TO THE MAP LAN.  ALL
** NETWORK B CONTROL PACKETS ARE HANDLED HERE.
*/

SERVICE_NETB_PACKET
   {
   IF (NETB CONNECT REQUEST)
      {
      GET NETB STATE TABLE ENTRY;
      IF (NONE AVAILABLE) SEVER REQUESTED NETB CONNECTION;
      SAVE PATH ID, NETB NODE NAME, AND NETB USER ID;
      ACCEPT NETB CONNECTION;
      }
   ELSE IF (NETB CONNECTION SEVER)
      {
      ABORT ALL MAP CONNECTIONS ACTIVE WITH THIS NETB CONNECTION;
      DEREGISTER ALL NAMES ASSOCIATED WITH THIS NETB CONNECTION;
      FREE ASSOCIATED STATE TABLE ENTRIES IN ALL 3 TABLES;
      }
   ELSE IF (NETB DATA)
      {
      CALL DECODE_UIDU;
      CALL PROCESS_UIDU;
```

```
    }
} /* END SERVICE_NETB_PACKET */

/*****************************************************************/
/*********** PROCESS_UIDU ****************************************/
/*****************************************************************/
/*
** THIS ROUTINE WILL FIRST VERIFY THAT THE INPUT DATA IS A UIDU
** INTERFACE PACKET. IT WILL THEN UPDATE STATE INFORMATION
** DEPENDING ON THE UIDU TYPE, AND GENERATE AN APPROPRIATE PACKET TO
** INTERFACE WITH THE MAP SERVICE PROVIDER.
*/
PROCESS_UIDU
    {
    IF (UIDU TYPE == U_DATA.REQUEST OR U_PART_DATA.REQUEST)
       CALL U_DATA_REQUEST_FROM_NETB;
    ELSE IF (UIDU TYPE == U_REGISTER.REQUEST)
       CALL U_REGISTER_REQUEST_FROM_NETB;
    ELSE IF (UIDU TYPE == U_DEREGISTER.REQUEST)
       CALL U_DEREGISTER_REQUEST_FROM_NETB;
    ELSE IF (UIDU TYPE == U_CONNECT.REQUEST)
       CALL U_CONNECT_REQUEST_FROM_NETB;
    ELSE IF (UIDU TYPE == U_CONNECT.RESPONSE)
       CALL U_CONNECT_RESPONSE_FROM_NETB;
    ELSE IF (UIDU TYPE == U_RELEASE.REQUEST)
       CALL U_RELEASE_REQUEST_FROM_NETB;
    ELSE IF (UIDU TYPE == U_RELEASE.RESPONSE)
       CALL U_RELEASE_RESPONSE_FROM_NETB;
    ELSE IF (UIDU TYPE == U_ABORT.REQUEST)
       CALL U_ABORT_REQUEST_FROM_NETB;
    ELSE
       SEND_UIDU (U_ERROR.INDICATION); /* UNKNOWN UIDU TYPE FROM NETB */
    } /* END PROCESS_UIDU */

/*****************************************************************/
/*********** U_DATA_REQUEST_FROM_NETB ****************************/
/*****************************************************************/
/*
** THIS ROUTINE HANDLES A UIDU DATA REQUEST.
*/
U_DATA_REQUEST_FROM_NETB
    {
    IN CONNECTION STATE TABLE;
    WITH NETB PATH AND UIDU CONNECTION NUMBER;
    FIND CONNECTION STATE, CLIENT TAG, CHANNEL NUMBER;
    IF (TABLE ENTRY NOT FOUND)
       {
       SEND_UIDU (U_ERROR.INDICATION); /* INVALID CONNECTION NUMBER */
       RETURN;
       }
```

```
IF (CONNECTION STATE NOT EQUAL 7 OR 11)
   {
   SEND_UIDU (U_ERROR.INDICATION);   /* INVALID REQUEST IN THIS STATE */
   RETURN;
   }
CALL BUILD_CONTROL_BLOCK (A_TRANSFER.REQUEST);
IF (UIDU TYPE == U_PART_DATA.REQUEST)
   ECM FLAG = 0;
ELSE
   {
   ECM FLAG = NON ZERO;
   CALL SEND_MAP_LAN_TRANSACTION (A_TRANSFER.REQUEST);
   }
} /* END U_DATA_REQUEST_FROM_NETB */

/****************************************************************/
/********** U_REGISTER_REQUEST_FROM_NETB ***********************/
/****************************************************************/
/*
** THIS ROUTINE HANDLES A UIDU REGISTER REQUEST.
** IT WILL UPDATE THE STATE TABLE AND SEND THE REQUEST TO THE
** MAP SERVICE PROVIDER TO BE PROCESSED.
*/
U_REGISTER_REQUEST_FROM_NETB
   {
   FROM REGISTRATION TABLE:
   VERIFY THIS NAME NOT ALREADY IN TABLE;
   IF (NAME ALREADY IN USE)          /* IN ANY STATE      */
      {
      SEND_UIDU (U_ERROR.INDICATION);  /* NAME ALREADY IN USE */
      RETURN;
      }
   GET A REGISTER STATE TABLE ENTRY;
   IF (NONE AVAILABLE)
      {
      SEND_UIDU (U.ERROR.INDICATION);   /* NO RESOURCE AVAILABLE */
      RETURN;
      }
   REGISTER_COUNTER = REGISTER_COUNTER + 1; /* TRACK TOTAL REG'S */
   SET CLIENT TAG(TABLE INDEX) = REGISTER TABLE ENTRY NUMBER;
   SET CLIENT TAG(REG COUNTER)= LOW BYTE OF REGISTER_COUNTER;
   SET CLIENT TAG(REQUEST ID ) = UIDU REQUEST ID;
   IN REGISTRATION TABLE ENTRY:
   SAVE NETB PATH,LOCAL NAME, CLIENT TAG, REGISTER STATE;
   CALL BUILD_CONTROL_BLOCK (A_REGISTER);/* USE UPDATED CLIENT TAG*/
   CALL SEND_MAP_LAN_TRANSACTION (A_REGISTER);
   SET REGISTER STATE = 2;
   } /* U_REGISTER_REQUEST_FROM_UIDU */

/****************************************************************/
```

```
/********** U_DEREGISTER_REQUEST_FROM_NETB *******************/
/*************************************************************/
/*
** THIS ROUTINE HANDLES A UIDU DEREGISTER REQUEST.
*/
U_DEREGISTER_REQUEST_FROM_NETB
  {
  FOR ALL REGISTER STATE TABLE ENTRIES:
    {
    IF (NETB PATH = REGISTER NETB PATH ID)
       {
       IF ((REGISTER STATE = 2) OR (REGISTER STATE = 3))
          SEND_UIDU (U_ERROR.INDICATION);    /* NOT REGISTERED */
       ELSE
          {
          /*** ABORT ALL OUTSTANDING CONNECTIONS WITH THIS NAME
               BEFORE TRYING TO DEREGISTER ***/
          FOR ALL CONNECTION STATE TABLE ENTRIES:
             {
             IF (REGISTRATION NAME INDEX = REGISTER STATE TABLE ENTRY NUMBER)
                {
                SET CLIENT TAG(REQUEST ID) = UIDU REQUEST ID;
                CALL BUILD_CONTROL_BLOCK (A_U_ABORT);
                CALL SEND_MAP_LAN_TRANSACTION (A_U_ABORT);
                }
             }
          SET CLIENT TAG(REQUEST ID) = UIDU REQUEST ID;
          CALL BUILD_CONTROL_BLOCK (A_DEREGISTER);
          CALL SEND_MAP_LAN_TRANSACTION (A_DEREGISTER);
          SET REGISTER STATE = 3;
          }
       }
    }
  }

/*************************************************************/
/********** U_CONNECT_REQUEST_FROM_NETB *********************/
/*************************************************************/
/*
** THIS ROUTINE HANDLES A UIDU CONNECT REQUEST.
*/
U_CONNECT_REQUEST_FROM_NETB
   {
   FROM REGISTRATION STATE TABLE:
   WITH UIDU LOCAL NAME: GET REGISTER STATE;
   IF ((NAME NOT FOUND) OR (REGISTER STATE NOT EQUAL 4))
      {
      SEND_UIDU (U_ERROR.INDICATION); /* LOCAL NAME NOT REGISTERED   */
      RETURN;
      }
```

```
GET CONNECTION STATE TABLE ENTRY;
IF (NONE AVAILABLE)
   {
   SEND_UIDU (U_ERROR.INDICATION);   /* NO RESOURCE AVAILABLE */
   RETURN;
   }
CONNECTION_COUNT = CONNECTION_COUNT + 1; /* TOTAL CONNECTIONS    */
SET CLIENT TAG(TABLE INDEX) = CONNECTION TABLE ENTRY;
SET CLIENT TAG(CONN COUNTER)= LOW BYTE OF CONNECTION_COUNT;
SET CLIENT TAG(REQUEST ID ) = USER UIDU REQUEST ID;
SET CHANNEL NUMBER = X'FFFF'; /* INIT TO UNUSED VALUE */
SAVE NETB PATH, AND CLIENT TAG IN CONNECTION TABLE ENTRY;
SAVE REMOTE NAME IN CONNECTION TABLE ENTRY; /* FOR NET MANAGEMENT */
SAVE REGISTRATION ENTRY NUMBER IN REGISTRATION NAME INDEX FOR THIS
CONNECTION TABLE ENTRY;
CALL BUILD_CONTROL_BLOCK (A_ASSOCIATE.REQUEST);
CALL SEND_MAP_LAN_TRANSACTION (A_ASSOCIATE.REQUEST);
SAVE CONNECTION STATE = 2;
   }

/****************************************************************/
/*********** U_CONNECT_RESPONSE_FROM_NETB *********************/
/****************************************************************/
/*
** THIS ROUTINE HANDLES A UIDU CONNECT RESPONSE.
*/
U_CONNECT_RESPONSE_FROM_NETB
   {
   FROM CONNECTION STATE TABLE:
   WITH NETB PATH AND CONNECTION NUMBER: GET CLIENT TAG, CONNECTION STATE;
   IF (TABLE ENTRY NOT FOUND)
      {
      SEND_UIDU (U_ERROR.INDICATION); /* INVALID CONNECTION NUMBER */
      RETURN;
      }
   IF (CONNECTION STATE NOT EQUAL 6)
      {
      SEND_UIDU (U_ERROR.INDICATION); /* INVALID REQUEST IN THIS STATE*/
      RETURN;
      }
   CALL BUILD_CONTROL_BLOCK (A_ASSOCIATE.RESPONSE);
   CALL SEND_MAP_LAN_TRANSACTION (A_ASSOCIATE.RESPONSE);
   IF (APDU RC EQUAL ZERO)
      SET CONNECTION STATE = 3;
   ELSE
      SET CONNECTION STATE = 4;
   }

/****************************************************************/
/*********** U_RELEASE_REQUEST_FROM_NETB *********************/
/****************************************************************/
```

```
/*
** THIS ROUTINE HANDLES A UIDU RELEASE REQUEST.
*/
U_RELEASE_REQUEST_FROM_NETB
   {
   FROM CONNECTION STATE TABLE:
   WITH NETB PATH AND CONNECTION NUMBER: GET CLIENT TAG, CONNECTION STATE;
   IF (TABLE ENTRY NOT FOUND)
      {
      SEND_UIDU (U_ERROR.INDICATION); /* INVALID CONNECTION NUMBER */
      RETURN;
      }
   IF (CONNECTION STATE NOT EQUAL 7)
      {
      SEND_UIDU (U_ERROR.INDICATION); /* INVALID REQUEST IN THIS STATE*/
      RETURN;
      }
   CALL BUILD_CONTROL_BLOCK (A_RELEASE.REQUEST);
   CALL SEND_MAP_LAN_TRANSACTION (A_RELEASE.REQUEST);
   SET CONNECTION STATE = 8;
   }

/****************************************************************/
/********** U_RELEASE_RESPONSE_FROM_NETB ********************/
/****************************************************************/
/*
** THIS ROUTINE HANDLES A UIDU RELEASE RESPONSE.
*/
U_RELEASE_RESPONSE_FROM_NETB
   {
   FROM CONNECTION STATE TABLE:
   WITH NETB PATH AND CONNECTION NUMBER:
   GET CLIENT TAG, CONNECTION STATE, CHANNEL NUMBER;
   IF (TABLE ENTRY NOT FOUND)
      {
      SEND_UIDU (U_ERROR.INDICATION); /* INVALID CONNECTION NUMBER */
      RETURN;
      }
   IF (CONNECTION STATE NOT EQUAL 11)
      {
      SEND_UIDU (U_ERROR.INDICATION); /* INVALID REQUEST IN THIS STATE*/
      RETURN;
      }
   CALL BUILD_CONTROL_BLOCK (A_RELEASE.RESPONSE);
   CALL SEND_MAP_LAN_TRANSACTION (A_RELEASE.RESPONSE);
   SET CONNECTION STATE = 9;
   }

/****************************************************************/
/********** U_ABORT_REQUEST_FROM_NETB ***********************/
```

```
/*****************************************************************/
/*
** THIS ROUTINE HANDLES A UIDU ABORT REQUEST.
*/
U_ABORT_REQUEST_FROM_NETB
   {
   FROM CONNECTION STATE TABLE:
   WITH NETB PATH AND CONNECTION NUMBER: GET CLIENT TAG, CONNECTION STATE:
   IF (TABLE ENTRY NOT FOUND)
      {
      SEND_UIDU (U_ERROR.INDICATION); /* INVALID CONNECTION NUMBER */
      RETURN;
      }
   IF (CONNECTION STATE EQUAL 2)
      {
      SEND_UIDU (U_ERROR.INDICATION); /* INVALID REQUEST IN THIS STATE*/
      RETURN;
      }
   CALL BUILD_CONTROL_BLOCK (A_U_ABORT.REQUEST);
   CALL SEND_MAP_LAN_TRANSACTION (A_U_ABORT.REQUEST);
   }

/*****************************************************************/
/*********** SERVICE MAP LAN PACKET ******************************/
/*****************************************************************/
/*
** THIS ROUTINE WILL PROCESS ALL PACKETS CONCERNING THE TRANSPORT
** OF DATA TO AND FROM THE MAP SERVICE PROVIDER.
*/
SERVICE MAP LAN PACKET
   {
   CALL DECODE_CONTROL_BLOCK;
   CALL PROCESS_MAP_LAN_TRANSACTION;
   } /* END SERVICE_MAP_LAN_PACKET */

/*****************************************************************/
/*********** PROCESS MAP LAN TRANSACTION *************************/
/*****************************************************************/
/*
** THIS ROUTINE WILL GET INPUT FROM THE MAP LAN. IT WILL THEN UPDATE
** STATE INFORMATION DEPENDING ON THE TRANSACTION TYPE, AND GENERATE
** AN APPROPRIATE UIDU TRANSACTION TO SEND TO NETWORK B.
*/
PROCESS MAP LAN TRANSACTON
   {
   IF (TRANSACTION TYPE == A_TRANSFER.INDICATION)
      CALL A_TRANSFER.INDICATION_FROM_MAP;
   ELSE IF (TRANSACTION TYPE == A_REGISTER)
      CALL A_REGISTER_FROM_MAP;
   ELSE IF (TRANSACTION TYPE == A_DEREGISTER)
```

```
    CALL A_DEREGISTER_FROM_MAP;
ELSE IF (TRANSACTION TYPE == A_ASSOCIATE.INDICATION)
    CALL A_ASSOCIATE.INDICATION_FROM_MAP;
ELSE IF (TRANSACTION TYPE == A_ASSOCIATE.CONFIRM)
    CALL A_ASSOCIATE.CONFIRM_FROM_MAP;
ELSE IF (TRANSACTION TYPE == A_RELEASE.INDICATION)
    CALL A_RELEASE.INDICATION_FROM_MAP;
ELSE IF (TRANSACTION TYPE == A_RELEASE.CONFIRM)
    CALL A_RELEASE.CONFIRM_FROM_MAP;
ELSE IF (TRANSACTION TYPE == A_U_ABORT.INDICATION OR
                             A_P_ABORT.INDICATION)
    CALL A_ABORT.INDICATION_FROM_MAP;
/***** ELSE STATUS TRANSACTION RETURNED *******/
ELSE IF (TRANSACTION TYPE == A_ASSOCIATE.REQUEST)
    CALL A_ASSOCIATE.REQUEST_FROM_MAP;
ELSE IF (TRANSACTION TYPE == A_ASSOCIATE.RESPONSE)
    CALL A_ASSOCIATE.RESPONSE_FROM_MAP;
ELSE IF (TRANSACTION TYPE == A_RELEASE.REQUEST)
    CALL A_RELEASE_REQUEST_FROM_MAP;
ELSE IF (TRANSACTION TYPE == A_RELEASE.RESPONSE)
    CALL A_RELEASE.RESPONSE_FROM_MAP;
ELSE IF (TRANSACTION TYPE == A_U_ABORT.REQUEST)
    CALL A_U_ABORT_REQUEST_FROM_MAP;
ELSE IF (TRANSACTION TYPE == A_TRANSFER.REQUEST)
    CALL A_TRANSFER.REQUEST_FROM_MAP;
ELSE
    LOG_ERROR_MSG (UNKNOWN TRANSACTION RECEIVED FROM MAP LAN);
} /* END PROCESS MAP-LAN TRANSACTION */

/***************************************************************/
/************** A_TRANSFER.INDICATION_FROM_MAP *****************/
/***************************************************************/
/*
** THIS ROUTINE HANDLES AN A_TRANSFER.INDICATION FROM THE MAP LAN
*/
A_TRANSFER.INDICATION_FROM_MAP
    {
    FROM CONNECTION STATE TABLE:
    WITH CLIENT TAG: GET NETB PATH ID, CONNECTION STATE;
    IF (TABLE ENTRY NOT VALID)  /* STATE 1 OR REUSED ENTRY */
        {
        A_U_ABORT.REQUEST THE CONNECTION THIS ARIVED ON;
        LOG_ERROR_MSG ( A_TRANSFER.IND RECEIVED WITH NO TABLE ENTRY,
                        CLIENT TAG = XXXX);
        RETURN;
        }
    IF (CONNECTION STATE NOT EQUAL 7,8,10)
        {
        LOG_ERROR_MSG ( A_TRANSFER.IND RECEIVED CONNECT STATE XX,
                        CLIENT TAG = XXXX);
```

```
      RETURN;
      }
   CALL BUILD_UIDU (U_DATA.INDICATION);
   CALL SEND_UIDU (U_DATA.INDICATION);
   }

/****************************************************************/
/********** A_REGISTER_FROM_MAP ********************************/
/****************************************************************/
/*
** THIS ROUTINE HANDLES AN A_REGISTER RETURNED STATUS FROM THE
** MAP LAN SERVICE PROVIDER
*/
A_REGISTER_FROM_MAP
   {
   FROM REGISTER STATE TABLE:
   WITH CLIENT TAG: GET NETB PATH ID, REGISTER STATE;
   IF (TABLE ENTRY NOT VALID)  /* STATE 1 OR REUSED ENTRY */
      {
      LOG_ERROR_MSG ( A_REGISTER RECEIVED WITH NO TABLE ENTRY,
                         CLIENT TAG = XXXX);
      RETURN; /* NOTHING WE CAN DO */
      }
   IF (REGISTER STATE NOT EQUAL 2)
      {
      LOG_ERROR_MSG ( A_REGISTER RECEIVED WITH REGISTER STATE XX,
                         CLIENT TAG = XXXX);
      RETURN; /* NOTHING WE CAN DO */
      }
   IN REGISTRATION STATE TABLE:
   SAVE NEW CLIENT TAG;
   CALL BUILD_UIDU (U_REGISTER.CONFIRM);
   CALL SEND_UIDU (U_REGISTER.CONFIRM);
   IF (RC EQUAL ZERO)
      SET REGISTER STATE = 4;   /* REGISTER COMPLETE         */
   ELSE
      SET REGISTER STATE = 1;   /* FREE TABLE ENTRY FOR REUSE */
   }

/****************************************************************/
/********** A_DEREGISTER_FROM_MAP *******************************/
/****************************************************************/
/*
** THIS ROUTINE HANDLES AN A_DEREGISTER RETURNED STATUS FROM
** THE MAP LAN SERVICE PROVIDER
*/
A_DEREGISTER_FROM_MAP
   {
   FROM REGISTER STATE TABLE:
   WITH CLIENT TAG: GET NETB PATH ID, REGISTER STATE;
```

```
IF (TABLE ENTRY NOT VALID)  /* STATE 1 OR REUSED ENTRY */
   {
   LOG_ERROR_MSG ( A_DEREGISTER RECEIVED WITH NO TABLE ENTRY,
                    CLIENT TAG = XXXX);
   RETURN; /* NOTHING WE CAN DO */
   }
IF (REGISTER STATE NOT EQUAL 3)
   {
   LOG_ERROR_MSG ( A_DEREGISTER RECEIVED WITH REGISTER STATE XX
                     ,CLIENT TAG = XXXX);
   RETURN; /* NOTHING WE CAN DO */
   }
IF (RC EQUAL ZERO OR X'02' OR X'12') /* SHOULD ONLY GET ZERO HERE */
   {
   CALL BUILD_UIDU (U_DEREGISTER.CONFIRM);
   CALL SEND_UIDU (U_DEREGISTER.CONFIRM);
   SET REGISTER STATE = 1;          /* FREE TABLE ENTRY FOR REUSE */
   }
ELSE
   {
   CALL SEND_UIDU (U_ERROR.INDICATION);   /* DEREGISTER FAILED */
   SET REGISTER STATE = 4;          /* STILL REGISTERED      */
   }

/****************************************************************/
/**********   A_ASSOCIATE.INDICATION_FROM_MAP  ******************/
/****************************************************************/
/*
** THIS ROUTINE HANDLES AN A_ASSOCIATE.INDICATION TRANSACTION FROM
** THE MAP LAN SERVICE PROVIDER
*/
A_ASSOCIATE.INDICATION_FROM_MAP
   {
   FROM REGISTER STATE TABLE:
   WITH CLIENT TAG: GET NETB PATH ID, REGISTRATION STATE;
   IF ((INDEXED ENTRY NOT VALID)      /* STATE 1 OR REUSED */
      OR (REGISTRATION STATE NOT EQUAL 4))
      {
      A_U_ABORT.REQUEST THE CONNECTION THIS ARIVED ON;
      LOG_ERROR_MSG( A_ASSOCIATE.IND RECEIVED WITH NO ASSOCIATED
                       REGISTER TABLE ENTRY, CLIENT TAG = XXXX);
      RETURN; /* THIS NAME NO LONGER REGISTERED WITH STATE TABLE */
      }
   GET CONNECTION STATE TABLE ENTRY;
   SET CLIENT TAG(TABLE INDEX) = CONNECTION TABLE ENTRY NUMBER;
   SET CLIENT TAG(CONN COUNTER) = LOW BYTE OF CONNECTION_COUNT;
   FILL IN CLIENT TAG,NETB PATH ID,CHANNEL NUMBER, REGISTRATION INDEX;
   CALL BUILD_UIDU (U_CONNECT.INDICATION);
   CALL SEND_UIDU (U_CONNECT.INDICATION);
   SET CONNECTION STATE = 6;
```

```
}

/****************************************************************/
/********** A_ASSOCIATE.CONFIRM_FROM_MAP ********************/
/****************************************************************/
/*
** THIS ROUTINE HANDLES AN A_ASSOCIATE.CONFIRM TRANSACTION FROM
** THE MAP LAN SERVICE PROVIDER
*/
A_ASSOCIATE.CONFIRM_FROM_MAP
   {
   FROM CONNECTION STATE TABLE:
   WITH CLIENT TAG: GET NETB PATH ID;
   IF (INDEXED ENTRY NOT VALID)     /* STATE 1 OR REUSED */
      {
      IF (APDU RC EQUAL ZERO) /* IF CONNECTION ACCEPTED, ABORT IT */
         A_U_ABORT.REQUEST THE CONNECTION THIS ARIVED ON;
      LOG_ERROR_MSG( A_ASSOCIATE.CONFIRM RECEIVED WITH NO
                        ASSOCIATED TABLE ENTRY, CLIENT TAG = XXXX);
      RETURN; /* THIS CONNECTION ALREADY ABORTED */
      }
   IF (CONNECTION STATE NOT EQUAL 5)
      {
      LOG_ERROR_MSG( A_ASSOCIATE.CONFIRM RECEIVED CONNECT STATE XX,
                        CLIENT TAG = XXXX);
      RETURN;
      }
   CALL BUILD_UIDU (U_CONNECT.CONFIRM);
   CALL SEND_UIDU (U_CONNECT.CONFIRM);
   IF (APDU RC EQUAL ZERO)
      SET CONNECTION STATE = 7;         /* CONNECTION COMPLETE  */
   ELSE                                  /* ELSE CONNECT REJECTED*/
      SET CONNECTION STATE = 1;         /* FREE ENTRY FOR REUSE */
   }

/****************************************************************/
/********** A_RELEASE.INDICATION_FROM_MAP ********************/
/****************************************************************/
/*
** THIS ROUTINE HANDLES AN A_RELEASE.INDICATION TRANSACTION FROM
** THE MAP LAN SERVICE PROVIDER
*/
A_RELEASE.INDICATION_FROM_MAP
   {
   FROM CONNECTION STATE TABLE:
   WITH CLIENT TAG: GET NETB PATH ID, CONNECTION STATE;
   IF (INDEXED ENTRY NOT VALID)     /* STATE 1 OR REUSED */
      {
      A_U_ABORT.REQUEST THE CONNECTION THIS ARIVED ON;
      LOG_ERROR_MSG( A_RELEASE.IND RECEIVED WITH NO
```

```
                              ASSOCIATED TABLE ENTRY. CLIENT TAG - XXXX);
      RETURN; /* THIS CONNECTION ALREADY ABORTED */
      }
   IF (CONNECTION STATE NOT EQUAL 7)
      {
      LOG_ERROR_MSG( A_RELEASE.IND RECEIVED CONNECT STATE XX,
                              CLIENT TAG - XXXX);
      RETURN;
      }
   CALL BUILD_UIDU (U_RELEASE.INDICATION);
   CALL SEND_UIDU(U_RELEASE.INDICATION);
   SET CONNECTION STATE - 11;
   }

/*****************************************************************/
/********** A_RELEASE.CONFIRM_FROM_MAP ***********************/
/*****************************************************************/
/*
** THIS ROUTINE HANDLES AN A_RELEASE.CONFIRM TRANSACTION FROM
** THE MAP LAN SERVICE PROVIDER
*/
A_RELEASE.CONFIRM_FROM_MAP
   {
   FROM CONNECTION STATE TABLE:
   WITH CLIENT TAG: GET NETB PATH ID, CONNECTION STATE;
   IF (INDEXED ENTRY NOT VALID)     /* STATE 1 OR REUSED */
      {
      LOG_ERROR_MSG( A_RELEASE.CONFIRM RECEIVED WITH NO
                              ASSOCIATED TABLE ENTRY. CLIENT TAG - XXXX);
      RETURN; /* THIS CONNECTION ALREADY ABORTED */
      }
   IF (CONNECTION STATE NOT EQUAL 10)
      {
      LOG_ERROR_MSG( A_RELEASE.CONFIRM RECEIVED CONNECT STATE XX,
                              CLIENT TAG - XXXX);
      SET CONNECTION STATE - 1; /* FREE ENTRY FOR REUSE */
      RETURN;
      }
   CALL BUILD_UIDU (U_RELEASE.CONFIRM);
   CALL SEND_UIDU (U_RELEASE.CONFIRM);
   SET CONNECTION STATE - 1; /* FREE ENTRY FOR REUSE */
   }

/*****************************************************************/
/********** A_ABORT.INDICATION_FROM_MAP *********************/
/*****************************************************************/
/*
** THIS ROUTINE HANDLES AN A_U_ABORT.INDICATION TRANSACTION OR AN
** A_P_ABORT.INDICATION TRANSACTION FROM THE MAP LAN SERVICE PROVIDER
*/
```

```
A_ABORT.INDICATION_FROM_MAP
   {
   FROM CONNECTION STATE TABLE:
   WITH CLIENT TAG: GET NETB PATH ID, CONNECTION STATE;
   IF (INDEXED ENTRY NOT VALID)      /* STATE 1 OR REUSED */
      {
      LOG_ERROR_MSG( A_ABORT.REQUEST RECEIVED WITH NO
                          ASSOCIATED TABLE ENTRY, CLIENT TAG = XXXX);
      RETURN; /* THIS CONNECTION ALREADY ABORTED */
      }
   CALL BUILD_UIDU (U_ABORT.INDICATION OR U_PABORT.INDICATION);
   CALL SEND_UIDU (U_ABORT.INDICATION OR U_PABORT.INDICATION);
   SET CONNECTION STATE = 1;      /* FREE ENTRY FOR REUSE */
   }

/****************************************************/
/********** A_ASSOCIATE.REQUEST_FROM_MAP ********************/
/****************************************************/

THIS ROUTINE HANDLES THE A_ASSOCIATE.REQUEST RETURNED STATUS
   FROM THE MAP SERVICE PROVIDER

ASSOCIATE.REQUEST_FROM_MAP
   {
   FROM CONNECTION STATE TABLE:
   WITH CLIENT TAG, GET NETB PATH ID, CONNECTION STATE;
   IF (INDEXED ENTRY NOT VALID)      /* STATE 1 OR REUSED */
      {
      LOG_ERROR_MSG( A_ASSOCIATE.REQUEST RECEIVED WITH NO
                          ASSOCIATED TABLE ENTRY, CLIENT TAG = XXXX);
      RETURN; /* THIS CONNECTION ALREADY ABORTED */
      }
   IF (CONNECTION STATE NOT EQUAL 2)
      {
      LOG_ERROR_MSG( A_ASSOCIATE.REQUEST RECEIVED CONNECT STATE XX,
                          CLIENT TAG = XXXX);
      RETURN;
      }
   IF (RC EQUAL ZERO)
      {
      SAVE CHANNEL NUMBER IN CONNECTION TABLE ENTRY;
      SET CONNECTION STATE = 5;  /* WAIT FOR ASSOCIATE CONFIRM */
      }
   ELSE
      {
      CALL BUILD_UIDU (U_ERROR.INDICATION);
      CALL SEND_UIDU (U_ERROR.INDICATION);
      SET CONNECTION STATE = 1;  /* FREE ENTRY FOR REUSE */
      }
   }
```

```
/****************************************************************/
/********** A_ASSOCIATE.RESPONSE_FROM_MAP ********************/
/****************************************************************/
/*
** THIS ROUTINE HANDLES THE A_ASSOCIATE.RESPONSE RETURNED STATUS
** FROM THE MAP LAN SERVICE PROVIDER
*/
A_ASSOCIATE.RESPONSE_FROM_MAP
   {
   FROM CONNECTION STATE TABLE:
   WITH CLIENT TAG: GET NETB PATH ID, CONNECTION STATE;
   IF (INDEXED ENTRY NOT VALID)      /* STATE 1 OR REUSED */
      {
      LOG_ERROR_MSG( A_ASSOCIATE.RESPONSE RECEIVED WITH NO
                        ASSOCIATED TABLE ENTRY, CLIENT TAG = XXXX);
      RETURN; /* THIS CONNECTION ALREADY ABORTED */
      }
   IF ((CONNECTION STATE NOT EQUAL 3) OR (CONNECTION STATE NOT EQUAL 4))
      {
      LOG_ERROR_MSG( A_ASSOCIATE.RESP RECEIVED CONNECT STATE XX,
                        CLIENT TAG = XXXX);
      RETURN;
      }
   IF (RC NOT EQUAL ZERO)
      {
      CALL BUILD_UIDU (U_ERROR.INDICATION); /* REASON IN RC */
      CALL SEND_UIDU (U_ERROR.INDICATION);
      SET CONNECTION STATE = 6;      /* STILL WAITING */
      }
   ELSE IF (CONNECTION STATE = 3)
      SET CONNECTION STATE = 7;      /* CONNECTED     */
   ELSE IF (CONNECTION STATE = 4)
      SET CONNECTION STATE = 1;      /* FREE ENTRY    */
   }

/****************************************************************/
/********** A_RELEASE.REQUEST_FROM_MAP ********************/
/****************************************************************/
/*
** THIS ROUTINE HANDLES THE A_RELEASE.REQUEST RETURNED STATUS
** FROM THE MAP LAN SERVICE PROVIDER
*/
A_RELEASE.REQUEST_FROM_MAP
   {
   FROM CONNECTION STATE TABLE:
   WITH CLIENT TAG: GET NETB PATH ID, CONNECTION STATE;
   IF (INDEXED ENTRY NOT VALID)      /* STATE 1 OR REUSED */
      {
      LOG_ERROR_MSG( A_RELEASE.REQUEST RECEIVED WITH NO
                        ASSOCIATED TABLE ENTRY, CLIENT TAG = XXXX);
```

```
            RETURN; /* THIS CONNECTION ALREADY ABORTED */
            }
        IF (CONNECTION STATE NOT EQUAL 8)
            {
            LOG_ERROR_MSG( A_RELEASE.REQUEST RECEIVED CONNECT STATE XX,
                                CLIENT TAG = XXXX);
            RETURN;
            }
        IF (RC NOT EQUAL ZERO)
            {
            CALL BUILD_UIDU (U_ERROR.INDICATION); /* REASON IN RC */
            CALL SEND_UIDU (U_ERROR.INDICATION);
            SET CONNECTION STATE = 7;    /* STILL CONNECTED */
            }
        ELSE
            SET CONNECTION STATE = 10;
        }

/****************************************************************/
/********** A_RELEASE.RESPONSE_FROM_MAP ************************/
/****************************************************************/
/*
** THIS ROUTINE HANDLES THE A_RELEASE.RESPONSE RETURNED STATUS
** FROM THE MAP LAN SERVICE PROVIDER
*/
A_RELEASE.RESPONSE_FROM_MAP
        {
        FROM CONNECTION STATE TABLE;
        WITH CLIENT TAG: GET NETB PATH ID, CONNECTION STATE;
        IF (INDEXED ENTRY NOT VALID)    /* STATE 1 OR REUSED */
            {
            LOG_ERROR_MSG( A_RELEASE.RESPONSE RECEIVED WITH NO
                                ASSOCIATED TABLE ENTRY, CLIENT TAG = XXXX);
            RETURN; /* THIS CONNECTION ALREADY ABORTED */
            }
        IF (CONNECTION STATE NOT EQUAL 9)
            {
            LOG_ERROR_MSG( A_RELEASE.RESPONSE RECEIVED CONNECT STATE XX,
                                CLIENT TAG = XXXX);
            RETURN;
            }
        IF (RC NOT EQUAL ZERO)
            {
            CALL BUILD_UIDU (U_ERROR.INDICATION); /* REASON IN RC */
            CALL SEND_UIDU (U_ERROR.INDICATION);
            SET CONNECTION STATE = 11;
            }
        ELSE
            SET CONNECTION STATE = 1;    /* FREE ENTRY FOR REUSE */
        }
```

```
/****************************************************************/
/*********** A_U_ABORT.REQUEST_FROM_MAP ***********************/
/****************************************************************/
/*
** THIS ROUTINE HANDLES THE A_U_ABORT.REQUEST RETURNED STATUS
** FROM THE MAP LAN SERVICE PROVIDER
*/
A_U_ABORT.REQUEST_FROM_MAP
   {
   FROM CONNECTION STATE TABLE:
   WITH CLIENT TAG: GET NETB PATH ID, CONNECTION STATE;
   IF (INDEXED ENTRY NOT VALID)      /* STATE 1 OR REUSED */
      {
      LOG_ERROR_MSG( A_ABORT.REQUEST RECEIVED WITH NO
                       ASSOCIATED TABLE ENTRY, CLIENT TAG = XXXX);
      RETURN; /* THIS CONNECTION ALREADY ABORTED */
      }
   IF (CONNECTION STATE EQUAL 2,3,4,8,9)
      {
      LOG_ERROR_MSG( A_ABORT.REQUEST RECEIVED CONNECT STATE XX,
                       CLIENT TAG = XXXX);
      RETURN;
      }
   IF (RC NOT EQUAL ZERO)
      {
      CALL BUILD_UIDU (U_ERROR.INDICATION); /* REASON IN RC */
      CALL SEND_UIDU (U_ERROR.INDICATION);
      }
   ELSE
      SET CONNECTION STATE = 1;    /* FREE ENTRY FOR REUSE */
   }

/****************************************************************/
/*********** A_TRANSFER.REQUEST_FROM_MAP ***********************/
/****************************************************************/
/*
** THIS ROUTINE HANDLES THE A_TRANSFER.REQUEST RETURNED STATUS
** FROM THE MAP LAN SERVICE PROVIDER
*/
A_TRANSFER.REQUEST_FROM_MAP
   {
   FROM CONNECTION STATE TABLE:
   WITH CLIENT TAG: GET NETB PATH ID, CONNECTION STATE;
   IF (INDEXED ENTRY NOT VALID)      /* STATE 1 OR REUSED */
      {
      LOG_ERROR_MSG( A_TRANSFER.REQUEST RECEIVED WITH NO
                       ASSOCIATED TABLE ENTRY, CLIENT TAG = XXXX);
      RETURN; /* THIS CONNECTION ALREADY ABORTED */
      }
   IF (CONNECTION STATE NOT EQUAL 7,11)
      {
```

```
      LOG_ERROR_MSG( A_TRANSFER.REQUEST RECEIVED CONNECT STATE XX,
                     CLIENT TAG - XXXX);
      RETURN;
      }
   IF (RC NOT EQUAL ZERO)
      {
      CALL BUILD_UIDU (U_ERROR.INDICATION); /* REASON IN RC */
      CALL SEND_UIDU (U_ERROR.INDICATION);
      }
   }

/****************************************************************/
/*********** SEND_MAP_LAN_TRANSACTION **************************/
/****************************************************************/
/*
** THIS ROUTINE WILL SEND A TRANSACTION TO THE MAP SERVICE PROVIDER.
*/
SEND_MAP_LAN_TRANSACTION
   {
   TRANSMIT FRAME ON DEFINED PROTOCOL;
   IF (ERROR SENDING TRANSACTION)
      {
      PLACE ERROR CODE IN RC FIELD OF TRANSACTION;
      PLACE ON MASTER QUEUE TO BE PROCESSED AS RETURNED STATUS;
      LOG_ERROR_MSG(SEND_MAP_LAN_TRANSACTION ERROR, RC - XXXX);
      }
   }

/****************************************************************/
/*********** SEND_UIDU *****************************************/
/****************************************************************/
/*
** THIS ROUTINE WILL SEND A UIDU TO THE NETWORK B SERVICE PROVIDER
*/
SEND_UIDU
   {
   TRANSMIT FRAME ON DEFINED PROTOCOL;
   IF (ERROR SENDING TRANSACTION)
      {
      LOG_ERROR_MSG(SEND_UIDU: SEND FAILED, RC - XXXX);

/*** ADDITIONAL ACTION MAY BE REQUIRED DEPENDING ON THE
           PROTOCOL, SUCH AS RETRY FOR RECOVERABLE ERRORS *****/
      }
   }

/****************************************************************/
/*********** MAP CASE APDU Format ******************************/
/****************************************************************/
** Definition of APDU Types and "Data Element" Identifiers
**
```

```
**  MAP_CASE_id = 'bf'x   - First octet of all MAP CASE APDUs
**
**  id_AARQ = '2d'x      - A_Associate Request
**  id_AARE = '2e'x      - A_Associate Response
**  id_RLRQ = '2f'x      - A_Release Request
**  id_RLRE = '30'x      - A_Release Response
**  id_UARQ = '31'x      - A_User_Abort Request
**  id_PARQ = '32'x      - A_Provider_Abort Request
**
**  id_reason      = '80'x  - Reason
**  id_sequence    = '30'x  - SEQUENCE
**  id_result      = '60'x     - RESULT
**  id_err_type    = '80'x        - Error Type Id
**  id_err_id      = '81'x        - Error Id
**  id_r_ap        = '80'x     - Recipient Application Process Title
**  id_r_ap_inst   = '81'x     - Recipient Application Process Instance Title
**  id_i_ap        = '82'x     - Initiator Application Process Title
**  id_i_ap_inst   = '83'x     - Initiator Application Process Instance Title
**  id_appl_context = '84'x    - Application Context
**  id_idauth      = '85'x     - Identification Authorization
**  id_user_info   = '87'x     - User Information
**
**  id_length_2    = '82'x  - 2-byte length field
**
**  AARQ APDU - A_Associate Request PDU Encoding
**
**      MAP_CASE_id    - MAP CASE id ('BF'x)
**      apdu_id        - APDU Id ('2D'x)
**      id_sequence    - SEQUENCE
**         id_r_ap        - Recipient Application Process Title
**         id_r_ap_inst   - Recipient Application Process Instance Title
**         id_i_ap        - Initiator Application Process Title
**         id_i_ap_inst   - Initiator Application Process Instance Title
**         id_appl_context - Application Context
**         id_idauth       - Identification Authorization
**         id_user_info    - User Information
**
**  AARE APDU - A_Associate Response PDU Encoding
**
**      MAP_CASE_id    - MAP CASE id ('BF'x)
**      apdu_id        - APDU Id ('2E'x)
**      id_sequence    - SEQUENCE
**         id_result       - RESULT
**           . id_err_type    - Error Type Id
**             id_err_id      - Error Id
**         id_r_ap        - Recipient Application Process Title
**         id_r_ap_inst   - Recipient Application Process Instance Title
**         id_i_ap        - Initiator Application Process Title
**         id_i_ap_inst   - Initiator Application Process Instance Title
**         id_appl_context - Application Context
**         id_user_info    - User Information
**
```

```
** RLRQ APDU - A_Release Request PDU Encoding
**
**      MAP_CASE_id   - MAP CASE id ('BF'x)
**      apdu_id       - APDU Id ('2F'x)
**      id_sequence   - SEQUENCE
**          id_user_info  - User Information
**
** RLRE APDU - A_Release Response PDU Encoding
**
**      MAP_CASE_id   - MAP CASE id ('BF'x)
**      apdu_id       - APDU Id ('30'x)
**      id_sequence   - SEQUENCE
**          id_user_info  - User Information
**
** UARQ APDU - A_User_Abort Request PDU Encoding
**
**      MAP_CASE_id   - MAP CASE id ('BF'x)
**      apdu_id       - APDU Id ('31'x)
**      id_reason     - Reason
**
** PARQ APDU - A_Provider_Abort Request PDU Encoding
**
**      MAP_CASE_id   - MAP CASE id ('BF'x)
**      parq_id       - APDU Id ('32'x)
**      id_reason     - Reason
*/

/****************************************************************/
/**********  DECODE APDU  ***************************************/
/****************************************************************/
/*
** THIS ROUTINE DECODES A MAP CASE APDU INTO ITS COMPONENT PARTS.
**
** VARIABLES USED AS INPUT BY THIS ROUTINE
**    MAPTRX - MAP CASE APDU
**
** VARIABLES SET AS OUTPUT BY THIS ROUTINE
**    TRX_ID       - MAP CASE IDENTIFIER ('BF'X)
**    APDU_ID      - MAP CASE APDU TYPE CODE
**    R_AP         - RECIPIENT APPLICATION PROCESS TITLE
**    R_AP_INST    - RECIPIENT APPLICATION PROCESS INSTANCE TITLE
**    I_AP         - INITIATOR APPLICATION PROCESS TITLE
**    I_AP_INST    - INITIATOR APPLICATION PROCESS INSTANCE TITLE
**    APPL_CONTEXT - APPLICATION CONTEXT
**    IDAUTH       - IDENTIFICATION/AUTHORIZATION
**    USER_INFO    - USER INFORMATION
**    ERR_TYPE     - ERROR TYPE CODE
**    ERR_ID       - ERROR ID CODE
**    REASON       - REASON CODE
*/
```

```
DECODE_APDU
   {
   PARSE VAR MAPTRX 1 TRX_ID 2 APDU_ID 3 TRX_REST;
   IF (TRX_ID ~= MAP_CASE_ID)    /* NOT A MAP CASE APDU */
      RETURN;
   VERIFY APDU_TYPE;   /* CHECK FOR VALID APDU TYPE */
   SET ALL PARAMETERS TO NULL;
   SET TRX_LGTH = LENGTH(MAPTRX);
   PARSE VAR TRX_REST 1 WRK_LGTH +1 TRX_REST;
   SET TRX_REM_LGTH = C2D(WRK_LGTH);
   IF (TRX_REM_LGTH > 127)
      {
      PARSE VAR TRX_REST 1 WRK_LGTH +2 TRX_REST;
      SET TRX_REM_LGTH = C2D(WRK_LGTH);
      }
   WHILE (TRX_REM_LGTH > 0)
      {
      PARSE VAR TRX_REST 1 WRK_ID +1 TRX_REST;
      PARSE VAR TRX_REST 1 WRK_LGTH +1 TRX_REST;
      SET WRK_LGTH = C2D(WRK_LGTH);
      IF (WRK_LGTH > 127)
         {
         PARSE VAR TRX_REST 1 WRK_LGTH +2 TRX_REST;
         SET WRK_LGTH = C2D(WRK_LGTH);
         }
      IF (WRK_ID == ID_SEQUENCE)
         {
         SET TRX_REM_LGTH = WRK_LGTH;
         SET TRX_SEQ_LGTH = WRK_LGTH;
         WHILE (TRX_SEQ_LGTH > 0)
            {
            PARSE VAR TRX_REST 1 WRK_ID +1 TRX_REST;
            PARSE VAR TRX_REST 1 WRK_LGTH +1 TRX_REST;
            SET WRK_LGTH = C2D(WRK_LGTH);
            SET TRX_REM_LGTH = TRX_REM_LGTH - WRK_LGTH -2;
            IF (WRK_ID == ID_R_AP)
               {
               SET R_AP = MAPAS2CH(SUBSTR(TRX_REST,1,WRK_LGTH));
               SET TRX_REST = SUBSTR(TRX_REST,WRK_LGTH+1);
               SET TRX_SEQ_LGTH = TRX_SEQ_LGTH - WRK_LGTH -2;
               }
            ELSE IF (WRK_ID == ID_R_AP_INST)
               {
               SET R_AP_INST = SUBSTR(TRX_REST,1,WRK_LGTH);
               SET TRX_REST = SUBSTR(TRX_REST,WRK_LGTH+1);
               SET TRX_SEQ_LGTH = TRX_SEQ_LGTH - WRK_LGTH -2;
               }
            ELSE IF (WRK_ID == ID_I_AP)
               {
               SET I_AP = MAPAS2CH(SUBSTR(TRX_REST,1,WRK_LGTH));
               SET TRX_REST = SUBSTR(TRX_REST,WRK_LGTH+1);
```

```
      SET TRX_SEQ_LGTH = TRX_SEQ_LGTH - WRK_LGTH  2;
      }
ELSE IF (WRK_ID == ID_I_AP_INST)
      {
      SET I_AP_INST = SUBSTR(TRX_REST,1,WRK_LGTH);
      SET TRX_REST = SUBSTR(TRX_REST,WRK_LGTH+1);
      SET TRX_SEQ_LGTH = TRX_SEQ_LGTH - WRK_LGTH -2;
      }
ELSE ID (WRK_ID == ID_APPL_CONTEXT)
      {
      SET APPL_CONTEXT = MAPAS2CH(SUBSTR(TRX_REST,1,WRK_LGTH));
      SET TRX_REST = SUBSTR(TRX_REST,WRK_LGTH+1);
      SET TRX_SEQ_LGTH = TRX_SEQ_LGTH - WRK_LGTH -2;
      }
ELSE IF (WRK_ID == ID_IDAUTH)
      {
      SET IDAUTH = SUBSTR(TRX_REST,1,WRK_LGTH);
      SET TRX_REST = SUBSTR(TRX_REST,WRK_LGTH+1);
      SET TRX_SEQ_LGTH = TRX_SEQ_LGTH - WRK_LGTH -2;
      }
ELSE IF (WRK_ID == ID_USER_INFO)
      {
      SET USER_INFO = MAPAS2CH(SUBSTR(TRX_REST,1,WRK_LGTH));
      SET TRX_REST = SUBSTR(TRX_REST,WRK_LGTH+1);
      SET TRX_SEQ_LGTH = TRX_SEQ_LGTH - WRK_LGTH -2;
      }
ELSE IF (WRK_ID == ID_RESULT)
      {
      SET TRX_RSLT_LGTH = WRK_LGTH;
      SET TRX_SEQ_LGTH = TRX_SEQ_LGTH - TRX_RSLT_LGTH - 2;
      WHILE (TRX_RSLT_LGTH > 0)
         {
         PARSE VAR TRX_REST 1 WRK_ID +1 TRX_REST;
         PARSE VAR TRX_REST 1 WRK_LGTH +1 TRX_REST;
         SET WRK_LGTH = C2D(WRK_LGTH);
         IF (WRK_ID == ID_ERR_TYPE)
            {
            SET ERR_TYPE = SUBSTR(TRX_REST,1,WRK_LGTH);
            SET TRX_REST = SUBSTR(TRX_REST,WRK_LGTH+1);
            SET TRX_RSLT_LGTH = TRX_RSLT_LGTH - WRK_LGTH -2;
            }
         ELSE IF (WRK_ID == ID_ERR_ID)
            {
            SET ERR_ID = SUBSTR(TRX_REST,1,WRK_LGTH);
            SET TRX_REST = SUBSTR(TRX_REST,WRK_LGTH+1);
            SET TRX_RSLT_LGTH = TRX_RSLT_LGTH - WRK_LGTH -2;
            }
         ELSE RETURN(ERROR);
         }
```

```
                }
            ELSE RETURN(ERROR);
              }
          }
        ELSE IF (WRK_ID == ID_REASON)
            {
            SET REASON = SUBSTR(TRX_REST,1,WRK_LGTH);
            SET TRX_REST = SUBSTR(TRX_REST,WRK_LGTH+1);
            SET TRX_REM_LGTH = TRX_REM_LGTH - WRK_LGTH -2;
            }
        ELSE RETURN(ERROR);
          }
    RETURN;
    }

/****************************************************************/
/********** BUILD APDU ******************************************/
/****************************************************************/
/*
** THIS ROUTINE BUILDS A MAP CASE APDU FROM ITS COMPONENT PARTS.
**
** VARIABLES USED AS INPUT BY THIS ROUTINE
**    APDUTYPE    - MAP CASE APDU TYPE
**    RAPTITLE    - RECIPIENT APPLICATION PROCESS TITLE
**    RAPINST     - RECIPIENT APPLICATION PROCESS INSTANCE TITLE
**    IAPTITLE    - INITIATOR APPLICATION PROCESS TITLE
**    IAPINST     - INITIATOR APPLICATION PROCESS INSTANCE TITLE
**    CONTEXT     - APPLICATION CONTEXT
**    IDAUTH      - IDENTIFICATION/AUTHORIZATION
**    USERINFO    - USER INFORMATION
**    ERRTYPE     - ERROR TYPE CODE
**    ERRID       - ERROR ID CODE
**    REASON      - REASON CODE
**
** VARIABLES SET AS OUTPUT BY THIS ROUTINE
**    MAPTRX - MAP CASE APDU
*/
BUILD_APDU
    {
    SET SEQLGTH = 0    /* INITIALIZE LENGTH TO ZERO */
    SET RESLGTH = 0    /* INITIALIZE LENGTH TO ZERO */
    /*
    ** CHECK APDU TYPE. CHECK FOR REQUIRED FIELDS. SET DEFAULT VALUES,
    ** AND BUILD APDU
    */
    IF (APDUTYPE == C'AARQ')      /* A_ASSOCIATE.REQUEST */
        {
        /*
        ** CHECK FOR REQUIRED PARAMETERS
        */
```

```
IF (RAPTITLE IS OMITTED)    /* RECIPIENT APPLICATION TITLE */
    RETURN(ERROR);
IF (IAPTITLE IS OMITTED)    /* INITIATOR APPLICATION TITLE */
    RETURN(ERROR);
/*
** SET DEFAULTS
*/
IF (CONTEXT IS OMITTED)     /* APPLICATION CONTEXT */
    SET CONTEXT = 'MAPCASE';
/*
** BUILD APDU
*/
IF (USERINFO IS PRESENT)
    {
    SET USERINFO = MAPCH2AS(USERINFO,'CONVERT');
    SET X7 = ID_USER_INFO!!D2C(LENGTH(USERINFO))!!USERINFO;
    SET SEQLGTH = SEQLGTH + LENGTH(X7);
    }
ELSE SET X7 = NULL;
IF (IDAUTH IS PRESENT)
    {
    SET IDAUTH = MAPCH2HX(IDAUTH,'CONVERT');
    SET X5 = ID_IDAUTH!!D2C(LENGTH(IDAUTH))!!IDAUTH;
    SET SEQLGTH = SEQLGTH + LENGTH(X5);
    }
ELSE SET X5 = NULL;
SET CONTEXT = MAPCH2AS(CONTEXT,'CONVERT');
SET X4 = ID_APPL_CONTEXT!!D2C(LENGTH(CONTEXT))!!CONTEXT;
SET SEQLGTH = SEQLGTH + LENGTH(X4);
IF (IAPINST IS PRESENT)
    {
    SET X3 = ID_I_AP_INST!!D2C(LENGTH(D2C(IAPINST)))!!D2C(IAPINST);
    SET SEQLGTH = SEQLGTH + LENGTH(X3);
    }
ELSE SET X3 = NULL;
SET IAPTITLE = MAPCH2AS(IAPTITLE,'CONVERT');
SET X2 = ID_I_AP!!D2C(LENGTH(IAPTITLE))!!IAPTITLE;
SET SEQLGTH = SEQLGTH + LENGTH(X2);
IF (RAPINST IS PRESENT)
    {
    SET X1 = ID_R_AP_INST!!D2C(LENGTH(D2C(RAPINST)))!!D2C(RAPINST);
    SET SEQLGTH = SEQLGTH + LENGTH(X1);
    }
ELSE SET X1 = NULL;
SET RAPTITLE = MAPCH2AS(RAPTITLE,'CONVERT');
SET X0 = ID_R_AP!!D2C(LENGTH(RAPTITLE))!!RAPTITLE;
SET SEQLGTH = SEQLGTH + LENGTH(X0);
IF (SEQLGTH < 128)
    SET XLGTH = D2C(SEQLGTH);
    ELSE SET XLGTH = ID_LENGTH_2!!D2C(SEQLGTH,2);
SET XSEQ = ID_SEQUENCE!!XLGTH;
```

```
   SET TRXLGTH = SEQLGTH + LENGTH(XSEQ);
   IF (TRXLGTH < 128)
      SET XLGTH = D2C(TRXLGTH);
      ELSE SET XLGTH = ID_LENGTH_2::D2C(TRXLGTH,2);
   SET XHDR = MAP_CASE_ID::ID_AARQ::XLGTH;
   SET MAPTRX = XHDR::XSEQ::X0::X1::X2::X3::X4::X5::X7;
   RETURN;
   }
ELSE IF (APDUTYPE == C'AARE')   /* A_ASSOCIATE.RESPONSE */
   {
   /*
   ** CHECK FOR REQUIRED PARAMETERS
   */
   IF (RAPTITLE IS OMITTED)   /* RECIPIENT APPLICATION TITLE */
      RETURN(ERROR);
   IF (IAPTITLE IS OMITTED)   /* INITIATOR APPLICATION TITLE */
      RETURN(ERROR);
   /*
   ** SET DEFAULTS
   */
   IF (CONTEXT IS OMITTED)    /* APPLICATION CONTEXT */
      SET CONTEXT = 'MAPCASE';
   IF (ERRTYPE IS OMITTED)    /* ERROR TYPE */
      SET ERRTYPE = 0;
   IF (ERRID IS OMITTED)      /* ERROR ID */
      SET ERRID = 0;
   /*
   ** BUILD APDU
   */
   IF (USERINFO IS PRESENT)
      {
      SET USERINFO = MAPCH2AS(USERINFO,'CONVERT');
      SET X7 = ID_USER_INFO::D2C(LENGTH(USERINFO))::USERINFO;
      SET SEQLGTH = SEQLGTH + LENGTH(X7);
      }
   ELSE SET X7 = NULL;
   SET CONTEXT = MAPCH2AS(CONTEXT,'CONVERT');
   SET X4 = ID_APPL_CONTEXT::D2C(LENGTH(CONTEXT))::CONTEXT;
   SET SEQLGTH = SEQLGTH + LENGTH(X4);
   IF (IAPINST IS PRESENT)
      {
      SET X3 = ID_I_AP_INST::D2C(LENGTH(D2C(IAPINST)))::D2C(IAPINST);
      SET SEQLGTH = SEQLGTH + LENGTH(X3);
      }
   ELSE SET X3 = NULL;
   SET IAPTITLE = MAPCH2AS(IAPTITLE,'CONVERT');
   SET X2 = ID_I_AP::D2C(LENGTH(IAPTITLE))::IAPTITLE;
   SET SEQLGTH = SEQLGTH + LENGTH(X2);
   IF (RAPINST IS PRESENT)
      {
      SET X1 = ID_R_AP_INST::D2C(LENGTH(D2C(RAPINST)))::D2C(RAPINST);
```

```
      SET SEQLGTH = SEQLGTH + LENGTH(X1);
      }
   ELSE SET X1 = NULL;
   SET RAPTITLE = MAPCH2AS(RAPTITLE,'CONVERT');
   SET X0 = ID_R_AP::D2C(LENGTH(RAPTITLE))::RAPTITLE;
   SET SEQLGTH = SEQLGTH + LENGTH(X0);
   SET XERRC = ID_ERR_ID::D2C(LENGTH(ERRID))::D2C(ERRID);
   SET RESLGTH = RESLGTH + LENGTH(XERRC);
   SET XERRT = ID_ERR_TYPE::D2C(LENGTH(ERRTYPE))::D2C(ERRTYPE);
   SET RESLGTH = RESLGTH + LENGTH(XERRT);
   SET XRES = ID_RESULT::D2C(RESLGTH)::XERRT::XERRC;
   SET SEQLGTH = SEQLGTH + LENGTH(XRES);
   IF (SEQLGTH < 128)
      SET XLGTH = D2C(SEQLGTH);
      ELSE SET XLGTH = ID_LENGTH_2::D2C(SEQLGTH,2);
   SET XSEQ = ID_SEQUENCE::XLGTH;
   SET TRXLGTH = SEQLGTH + LENGTH(XSEQ);
   IF (TRXLGTH < 128)
      SET XLGTH = D2C(TRXLGTH);
      ELSE SET XLGTH = ID_LENGTH_2::D2C(TRXLGTH,2);
   SET XHDR = MAP_CASE_ID::ID_AARE::XLGTH;
   SET MAPTRX = XHDR::XSEQ::XRES::X0::X1::X2::X3::X4::X7;
   RETURN;
   }
ELSE IF (APDUTYPE == C'RLRQ')   /* A_RELEASE.REQUEST */
   {
   /*
   ** BUILD APDU
   */
   IF (USERINFO IS PRESENT)
      {
      SET USERINFO = MAPCH2AS(USERINFO,'CONVERT');
      SET X7 = ID_USER_INFO::D2C(LENGTH(USERINFO))::USERINFO;
      SET SEQLGTH = SEQLGTH + LENGTH(X7);
      }
   ELSE SET X7 = NULL;
   IF (SEQLGTH < 128)
      SET XLGTH = D2C(SEQLGTH);
      ELSE SET XLGTH = ID_LENGTH_2::D2C(SEQLGTH,2);
   SET XSEQ = ID_SEQUENCE::XLGTH;
   SET TRXLGTH = SEQLGTH + LENGTH(XSEQ);
   IF (TRXLGTH < 128)
      SET XLGTH = D2C(TRXLGTH);
      ELSE SET XLGTH = ID_LENGTH_2::D2C(TRXLGTH,2);
   SET XHDR = MAP_CASE_ID::ID_RLRQ::XLGTH;
   SET MAPTRX = XHDR::XSEQ::X7;
   RETURN;
   }
ELSE IF (APDUTYPE == C'RLRE')   /* A_RELEASE.RESPONSE */
   {
   /*
```

```
** BUILD APDU
*/
IF (USERINFO IS PRESENT)
   {
   SET USERINFO = MAPCH2AS(USERINFO,'CONVERT');
   SET X7 = ID_USER_INFO!!D2C(LENGTH(USERINFO))!!USERINFO;
   SET SEQLGTH = SEQLGTH + LENGTH(X7);
   }
ELSE SET X7 = NULL;
   IF (SEQLGTH < 128)
      SET XLGTH = D2C(SEQLGTH);
      ELSE SET XLGTH = ID_LENGTH_2!!D2C(SEQLGTH,2);
   SET XSEQ = ID_SEQUENCE!!XLGTH;
   SET TRXLGTH = SEQLGTH + LENGTH(XSEQ);
   IF (TRXLGTH < 128)
      SET XLGTH = D2C(TRXLGTH);
      ELSE SET XLGTH = ID_LENGTH_2!!D2C(TRXLGTH,2);
   SET XHDR = MAP_CASE_ID!!ID_RLRE!!XLGTH;
   SET MAPTRX = XHDR!!XSEQ!!X7;
   RETURN;
   }
ELSE IF (APDUTYPE == C'UARQ')    /* A_U_ABORT.REQUEST */
   {
   /*
   ** CHECK FOR REQUIRED PARAMETERS
   */
   IF (REASON IS OMITTED)     /* REASON CODE */
      RETURN(ERROR);
   /*
   ** BUILD APDU
   */
   SET XO = ID_REASON!!D2C(LENGTH(D2C(REASON)))!!D2C(REASON);
   SET TRXLGTH = LENGTH(XO);
   IF (TRXLGTH < 128)
      SET XLGTH = D2C(TRXLGTH);
   ELSE SET XLGTH = ID_LENGTH_2!!D2C(TRXLGTH,2);
   SET XHDR = MAP_CASE_ID!!ID_UARQ!!XLGTH;
   SET MAPTRX = XHDR!!XO;
   RETURN;
   }
  ELSE RETURN(ERROR);              /* INVALID APDU TYPE */
  }

/***************************************************************/
/********** INI MP-500 Control Block Format *******************/
/***************************************************************/
/*
** Definition of INI MP-500 Control Blocks:
** id_A_Associate_request   = '0701'x     /* A_Associate Request */
** id_A_Associate_indication = '0702'x    /* A_Associate Indication */
```

```
**  id_A_Associate_response   = '0703'x     /* A_Associate Response */
**  id_A_Associate_confirm    = '0704'x     /* A_Associate Confirm */
**  id_A_Release_request      = '0705'x     /* A_Release Request */
**  id_A_Release_indication   = '0706'x     /* A_Release Indication */
**  id_A_Release_response     = '0707'x     /* A_Release Response */
**  id_A_Release_confirm      = '0708'x     /* A_Release Confirm */
**  id_A_U_Abort_request      = '0709'x     /* A_User_Abort Request */
**  id_A_U_Abort_indication   = '070A'x     /* A_User_Abort Indication */
**  id_A_P_Abort_indication   = '070B'x     /* A_Provider_Abort Indication */
**  id_A_Transfer_request     = '070C'x     /* A_Transfer Request */
**  id_A_Transfer_indication  = '070D'x     /* A_Transfer Indication */
**  id_A_Register             = '0731'x     /* A_Register */
**  id_A_Deregister           = '0732'x     /* A_Deregister */
**
**  A_Associate.request Control Block Encoding
**
**      cb_type_code        - Type Code ('0701'x)
**      cb_return_code      - Return Code
**      cb_channel          - Channel
**      cb_client_tag       - Client Tag
**      cb_buffer_pool      - Buffer Pool
**      CASE_APDU           - MAP CASE APDU (AARQ)
**
**  A_Associate.indication Control Block Encoding
**
**      cb_type_code        - Type Code ('0702'x)
**      "reserved"          - Reserved
**      cb_channel          - Channel
**      cb_client_tag       - Client Tag
**      "reserved"          - Reserved
**      CASE_APDU           - MAP CASE APDU (AARQ)
**
**  A_Associate.response Control Block Encoding
**
**      cb_type_code        - Type Code ('0703'x)
**      cb_return_code      - Return Code
**      cb_channel          - Channel
**      cb_client_tag       - Client Tag
**      cb_buffer_pool      - Buffer Pool
**      CASE_APDU           - MAP CASE APDU (AARE)
**
**  A_Associate.confirm Control Block Encoding
**
**      cb_type_code        - Type Code ('0704'x)
**      "reserved"          - Reserved
**      cb_channel          - Channel
**      cb_client_tag       - Client Tag
**      "reserved"          - Reserved
**      CASE_APDU           - MAP CASE APDU (AARE)
**
```

```
** A_Release.request Control Block Encoding
**
**      cb_type_code      - Type Code ('0705'x)
**      cb_return_code    - Return Code
**      cb_channel        - Channel
**      cb_client_tag     - Client Tag
**      "reserved"        - Reserved
**      CASE_APDU         - MAP CASE APDU (RLRQ)
**
** A_Release.indication Control Block Encoding
**
**      cb_type_code      - Type Code ('0706'x)
**      "reserved"        - Reserved
**      cb_channel        - Channel
**      cb_client_tag     - Client Tag
**      "reserved"        - Reserved
**      CASE_APDU         - MAP CASE APDU (RLRQ)
**
** A_Release.response Control Block Encoding
**
**      cb_type_code      - Type Code ('0707'x)
**      cb_return_code    - Return Code
**      cb_channel        - Channel
**      cb_client_tag     - Client Tag
**      "reserved"        - Reserved
**      CASE_APDU         - MAP CASE APDU (RLRE)
**
** A_Release.confirm Control Block Encoding
**
**      cb_type_code      - Type Code ('0708'x)
**      "reserved"        - Reserved
**      cb_channel        - Channel
**      cb_client_tag     - Client Tag
**      "reserved"        - Reserved
**      CASE_APDU         - MAP CASE APDU (RLRE)
**
** A_U_Abort.request Control Block Encoding
**
**      cb_type_code      - Type Code ('0709'x)
**      cb_return_code    - Return Code
**      cb_channel        - Channel
**      cb_client_tag     - Client Tag
**      "reserved"        - Reserved
**      CASE_APDU         - MAP CASE APDU (UARQ)
**
** A_U_Abort.indication Control Block Encoding
**
**      cb_type_code      - Type Code ('070A'x)
**      "reserved"        - Reserved
**      cb_channel        - Channel
**      cb_client_tag     - Client Tag
```

```
**      "reserved"         - Reserved
**      CASE_APDU          - MAP CASE APDU (UARQ)
**
** A_P_Abort.indication Control Block Encoding
**
**      cb_type_code       - Type Code ('070B'x)
**      "reserved"         - Reserved
**      cb_channel         - Channel
**      cb_client_tag      - Client Tag
**      "reserved"         - Reserved
**      CASE_APDU          - MAP CASE APDU (PARQ)
**
** A_Transfer.request Control Block Encoding
**
**      cb_type_code       - Type Code ('070C'x)
**      cb_return_code     - Return Code
**      cb_channel         - Channel
**      cb_client_tag      - Client Tag
**      cb_eom_flag        - EOM Flag
**      cb_data_length     - Data Length
**      cb_data_pointer    - Data Pointer
**      cb_buffer_length   - Buffer Length
**      cb_buffer_pointer  - Buffer Pointer
**      cb_userdata        - User Data
**
** A_Transfer.indication Control Block Encoding
**
**      cb_type_code       - Type Code ('070D'x)
**      "reserved"         - Reserved
**      cb_channel         - Channel
**      cb_client_tag      - Client Tag
**      cb_eom_flag        - EOM Flag
**      cb_data_length     - Data Length
**      cb_data_pointer    - Data Pointer
**      cb_buffer_length   - Buffer Length
**      cb_buffer_pointer  - Buffer Pointer
**      cb_userdata        - User Data
**
** A_Register Control Block Encoding
**
**      cb_type_code       - Type Code ('0731'x)
**      cb_return_code     - Return Code
**      "reserved"         - Reserved
**      cb_client_tag      - Client Tag
**      "reserved"         - Reserved
**      cb_driver_id       - Driver ID
**      cb_title_length    - Title Length
**      cb_title           - Title
**      "reserved"         - Reserved
**
```

```
** A_Deregister Control Block Encoding
**
**      cb_type_code       - Type Code ('0732'x)
**      cb_return_code     - Return Code
**      "reserved"         - Reserved
**      cb_client_tag      - Client Tag
**      "reserved"         - Reserved
**      cb_driver_id       - Driver ID
**      cb_title_length    - Title Length
**      cb_title           - Title
**      "reserved"         - Reserved
**
*/

/****************************************************************/
/*********** DECODE CONTROL BLOCK ******************************/
/****************************************************************/
/*
** THIS ROUTINE DECODES AN INI MP-500 CONTROL BLOCK INTO ITS
** COMPONENT PARTS.
**
** VARIABLES USED AS INPUT BY THIS ROUTINE:
**    CONTROL_BLOCK - INI MP-500 CONTROL BLOCK
**
** VARIABLES SET AS OUTPUT BY THIS ROUTINE:
**    CB_TYPE_CODE       - TYPE CODE
**    CB_RETURN_CODE     - RETURN CODE
**    CB_CHANNEL         - CHANNEL
**    CB_CLIENT_TAG      - CLIENT TAG
**    CB_BUFFER_POOL     - BUFFER POOL
**    CB_EOM_FLAG        - EOM FLAG
**    CB_DATA_LENGTH     - DATA LENGTH
**    CB_DATA_POINTER    - DATA POINTER
**    CB_BUFFER_LENGTH   - BUFFER LENGTH
**    CB_BUFFER_POINTER  - BUFFER POINTER
**    CB_USERDATA        - USER DATA
**    CB_DRIVER_ID       - DRIVER ID
**    CB_TITLE_LENGTH    - TITLE LENGTH
**    CB_TITLE           - TITLE
**    CASE_APDU          - MAP CASE APDU
*/
DECODE_CONTROL_BLOCK:
   {
   PARSE VAR CONTROL_BLOCK 1 CB_TYPE_CODE 3 X2 5 X3 7 X4 11 X5 13 CB_REST;
   SET ALL OUTPUT PARAMETERS TO NULL;
   IF (CB_TYPE_CODE == ID_A_ASSOCIATE_REQUEST)
      {
      SET CB_RETURN_CODE = X2;
      SET CB_CHANNEL     = X3;
      SET CB_CLIENT_TAG  = X4;
```

```
    SET CB_BUFFER_POOL = X5;
    SET CASE_APDU      = CB_REST;
    RETURN;
    }
ELSE IF (CB_TYPE_CODE = ID_A_ASSOCIATE_INDICATION)
    {
    SET CB_CHANNEL     = X3;
    SET CB_CLIENT_TAG  = X4;
    SET CASE_APDU      = CB_REST;
    RETURN;
    }
ELSE IF (CB_TYPE_CODE = ID_A_ASSOCIATE_RESPONSE)
    {
    SET CB_RETURN_CODE = X2;
    SET CB_CHANNEL     = X3;
    SET CB_CLIENT_TAG  = X4;
    SET CB_BUFFER_POOL = X5;
    SET CASE_APDU      = CB_REST;
    RETURN;
    }
ELSE IF (CB_TYPE_CODE = ID_A_ASSOCIATE_CONFIRM)
    {
    SET CB_CHANNEL     = X3;
    SET CB_CLIENT_TAG  = X4;
    SET CASE_APDU      = CB_REST;
    RETURN;
    }
ELSE IF (CB_TYPE_CODE = ID_A_RELEASE_REQUEST)
    {
    SET CB_RETURN_CODE = X2;
    SET CB_CHANNEL     = X3;
    SET CB_CLIENT_TAG  = X4;
    SET CASE_APDU      = CB_REST;
    RETURN;
    }
ELSE IF (CB_TYPE_CODE = ID_A_RELEASE_INDICATION)
    {
    SET CB_CHANNEL     = X3;
    SET CB_CLIENT_TAG  = X4;
    SET CASE_APDU      = CB_REST;
    RETURN;
    }
ELSE IF (CB_TYPE_CODE = ID_A_RELEASE_RESPONSE)
    {
    SET CB_RETURN_CODE = X2;
    SET CB_CHANNEL     = X3;
    SET CB_CLIENT_TAG  = X4;
    SET CASE_APDU      = CB_REST;
    RETURN;
    }
```

```
ELSE IF (CB_TYPE_CODE = ID_A_RELEASE_CONFIRM)
   {
   SET CB_CHANNEL    = X3;
   SET CB_CLIENT_TAG = X4;
   SET CASE_APDU     = CB_REST;
   RETURN;
   }
ELSE IF (CB_TYPE_CODE = ID_A_U_ABORT_REQUEST)
   {
   SET CB_RETURN_CODE = X2;
   SET CB_CHANNEL     = X3;
   SET CB_CLIENT_TAG  = X4;
   SET CASE_APDU      = CB_REST;
   RETURN;
   }
ELSE IF (CB_TYPE_CODE = ID_A_U_ABORT_INDICATION)
   {
   SET CB_CHANNEL    = X3;
   SET CB_CLIENT_TAG = X4;
   SET CASE_APDU     = CB_REST;
   RETURN;
   }
ELSE IF (CB_TYPE_CODE = ID_A_P_ABORT_INDICATION)
   {
   SET CB_CHANNEL    = X3;
   SET CB_CLIENT_TAG = X4;
   SET CASE_APDU     = CB_REST;
   RETURN;
   }
ELSE IF (CB_TYPE_CODE = ID_A_TRANSFER_REQUEST)
   {
   SET CB_RETURN_CODE     = X2;
   SET CB_CHANNEL         = X3;
   SET CB_CLIENT_TAG      = X4;
   SET CB_EOM_FLAG        = X5;
   PARSE VAR CB_REST 1 X6 3 X7 7 X8 9 X9 13 CB_REST;
   SET CB_DATA_LENGTH     = X6;
   SET CB_DATA_POINTER    = X7;
   SET CB_BUFFER_LENGTH   = X8;
   SET CB_BUFFER_POINTER  = X9;
   SET CB_USERDATA        = CB_REST;
   RETURN;
   }
  ELSE IF (CB_TYPE_CODE = ID_A_TRANSFER_INDICATION)
     {
     SET CB_CHANNEL    = X3;
     SET CB_CLIENT_TAG = X4;
     SET CB_EOM_FLAG   = X5;
     PARSE VAR CB_REST 1 X6 3 X7 7 X8 9 X9 13 CB_REST;
     SET CB_DATA_LENGTH = X6;
```

```
      SET CB_DATA_POINTER   = X7;
      SET CB_BUFFER_LENGTH  = X8;
      SET CB_BUFFER_POINTER = X9;
      SET CB_USERDATA       = CB_REST;
      RETURN;
      }
   ELSE IF (CB_TYPE_CODE = ID_A_REGISTER)
      {
      SET CB_RETURN_CODE  = X2;
      SET CB_CLIENT_TAG   = X4;
      PARSE VAR CB_REST 1 X6 3 X7 5 CB_REST;
      SET CB_DRIVER_ID    = X6;
      SET CB_TITLE_LENGTH = X7;
      SET WRK_LGTH        = C2D(CB_TITLE_LENGTH);
      SET CB_TITLE        = SUBSTR(CB_REST,1,WRK_LGTH);
      RETURN;
      }
   ELSE IF (CB_TYPE_CODE = ID_A_DEREGISTER)
      {
      SET CB_RETURN_CODE  = X2;
      SET CB_CLIENT_TAG   = X4;
      PARSE VAR CB_REST 1 X6 3 X7 5 CB_REST;
      SET CB_DRIVER_ID    = X6;
      SET CB_TITLE_LENGTH = X7;
      SET WRK_LGTH        = C2D(CB_TITLE_LENGTH);
      SET CB_TITLE        = SUBSTR(CB_REST,1,WRK_LGTH);
      RETURN;
      }
   ELSE RETURN(ERROR);
   }

/****************************************************************/
/********** BUILD CONTROL BLOCK ********************************/
/****************************************************************/
**
** THIS ROUTINE BUILDS AN INI MP-500 CONTROL BLOCK FROM ITS
** COMPONENT PARTS.
**
** VARIABLES USED AS INPUT BY THIS ROUTINE:
**    CB_TYPE_CODE       - TYPE CODE
**    CB_RETURN_CODE     - RETURN CODE
**    CB_CHANNEL         - CHANNEL
**    CB_CLIENT_TAG      - CLIENT TAG
**    CB_BUFFER_POOL     - BUFFER POOL
**    CB_EOM_FLAG        - EOM FLAG
**    CB_DATA_LENGTH     - DATA LENGTH
**    CB_DATA_POINTER    - DATA POINTER
**    CB_BUFFER_LENGTH   - BUFFER LENGTH
**    CB_BUFFER_POINTER  - BUFFER POINTER
**    CB_USERDATA        - USER DATA
**    CB_DRIVER_ID       - DRIVER ID
```

```
**    CB_TITLE_LENGTH  - TITLE LENGTH
**    CB_TITLE         - TITLE
**    CASE_APDU        - MAP CASE APDU
**
** VARIABLES SET AS OUTPUT BY THIS ROUTINE:
**    CONTROL_BLOCK - INI MP-500 CONTROL BLOCK
*/
BUILD_CONTROL_BLOCK:
   {
   /*
   ** CHECK CONTROL BLOCK TYPE AND BUILD IT
   */
   IF (CB_TYPE_CODE = ID_A_ASSOCIATE_REQUEST)
      {
      SET X1 = CB_TYPE_CODE;
      SET X2 = '0000'X;
      SET X3 = '0000'X;
      SET X4 = CB_CLIENT_TAG;
      SET X5 = '0000'X;
      SET X6 = CASE_APDU;
      SET CONTROL_BLOCK = X1::X2::X3::X4::X5::X6;
      RETURN;
      }
    ELSE IF (CB_TYPE_CODE = ID_A_ASSOCIATE_RESPONSE)
      {
      SET X1 = CB_TYPE_CODE;
      SET X2 = '0000'X;
      SET X3 = CB_CHANNEL;
      SET X4 = CB_CLIENT_TAG;
      SET X5 = '0000'X;
      SET X6 = CASE_APDU;
      SET CONTROL_BLOCK = X1::X2::X3::X4::X5::X6;
      RETURN;
      }
    ELSE IF (CB_TYPE_CODE = ID_A_RELEASE_REQUEST)
      {
      SET X1 = CB_TYPE_CODE;
      SET X2 = '0000'X;
      SET X3 = CB_CHANNEL;
      SET X4 = CB_CLIENT_TAG;
      SET X5 = '0000'X;
      SET X6 = CASE_APDU;
      SET CONTROL_BLOCK = X1::X2::X3::X4::X5::X6;
      RETURN;
      }
    ELSE IF (CB_TYPE_CODE = ID_A_RELEASE_RESPONSE)
      {
      SET X1 = CB_TYPE_CODE;
      SET X2 = '0000'X;
      SET X3 = CB_CHANNEL;
```

```
     SET X4 = CB_CLIENT_TAG;
     SET X5 = '0000'X;
     SET X6 = CASE_APDU;
     SET CONTROL_BLOCK = X1!!X2!!X3!!X4!!X5!!X6;
     RETURN;
     }
  ELSE IF (CB_TYPE_CODE = ID_A_U_ABORT_REQUEST)
     {
     SET X1 = CB_TYPE_CODE;
     SET X2 = '0000'X;
     SET X3 = CB_CHANNEL;
     SET X4 = CB_CLIENT_TAG;
     SET X5 = '0000'X;
     SET X6 = CASE_APDU;
     SET CONTROL_BLOCK = X1!!X2!!X3!!X4!!X5!!X6;
     RETURN;
     }
  ELSE IF (CB_TYPE_CODE = ID_A_TRANSFER_REQUEST)
     {
     SET X1 = CB_TYPE_CODE;
     SET X2 = '0000'X;
     SET X3 = CB_CHANNEL;
     SET X4 = CB_CLIENT_TAG;
     SET X5 = CB_EOM_FLAG;
     SET X6 = CB_DATA_LENGTH;
     SET X7 = '00000000'X;
     SET X8 = '0000'X;
     SET X9 = '00000000'X;
     SET X10 = CB_USERDATA;
     SET CONTROL_BLOCK = X1!!X2!!X3!!X4!!X5!!X6!!X7!!X8!!X9!!X10;
     RETURN;
     }
  ELSE IF (CB_TYPE_CODE = ID_A_REGISTER)
     {
     SET X1 = CB_TYPE_CODE;
     SET X2 = '0000'X;
     SET X3 = '0000'X;
     SET X4 = CB_CLIENT_TAG;
     SET X5 = '0000'X;
     SET X6 = '0000'X;
     SET X7 = CB_TITLE_LENGTH;
     SET X8 = CB_TITLE;
     SET X9 = COPIES('00'X,64);
     SET CONTROL_BLOCK = X1!!X2!!X3!!X4!!X5!!X6!!X7!!X8!!X9;
     RETURN;
     }
  ELSE IF (CB_TYPE_CODE = ID_A_DEREGISTER)
     {
     SET X1 = CB_TYPE_CODE;
     SET X2 = '0000'X;
```

```
    SET X3 = '0000'X;
    SET X4 = CB_CLIENT_TAG;
    SET X5 = '0000'X;
    SET X6 = '0000'X;
    SET X7 = CB_TITLE_LENGTH;
    SET X8 = CB_TITLE;
    SET X9 = COPIES('00'X,64);
    SET CONTROL_BLOCK = X1!!X2!!X3!!X4!!X5!!X6!!X7!!X8!!X9;
    RETURN;
    }
 ELSE RETURN(ERROR);
 }

/*****************************************************************/
/*********** UIDU Format *****************************************/
/*****************************************************************/
/*
** Definition of UIDU Types and "Parameter Type" Identifiers
**
** id_u_connect_req      = '04'x    /* U_CONNECT.request */
** id_u_connect_ind      = '05'x    /* U_CONNECT.indication */
** id_u_connect_resp     = '06'x    /* U_CONNECT.response */
** id_u_connect_conf     = '07'x    /* U_CONNECT.confirm */
** id_u_data_req         = '08'x    /* U_DATA.request */
** id_u_data_ind         = '09'x    /* U_DATA.indication */
** id_u_part_data_req    = '0C'x    /* U_PART_DATA.request */
** id_u_part_data_ind    = '0D'x    /* U_PART_DATA.indication */
** id_u_release_req      = '14'x    /* U_RELEASE.request */
** id_u_release_ind      = '15'x    /* U_RELEASE.indication */
** id_u_release_resp     = '16'x    /* U_RELEASE.response */
** id_u_release_conf     = '17'x    /* U_RELEASE.confirm */
** id_u_abort_req        = '18'x    /* U_ABORT.request */
** id_u_abort_ind        = '19'x    /* U_ABORT.indication */
** id_u_pabort_ind       = '1D'x    /* U_PABORT.indication */
** id_u_error_ind        = '29'x    /* U_ERROR.indication */
** id_u_register_req     = '2C'x    /* U_REGISTER.request */
** id_u_register_conf    = '2F'x    /* U_REGISTER.confirm */
** id_u_deregister_req   = '30'x    /* U_DEREGISTER.request */
** id_u_deregister_conf  = '33'x    /* U_DEREGISTER.confirm */
**
** id_u_remuname = '01'x      /* Remote User Name */
** id_u_locuname = '02'x      /* Local User Name */
** id_u_commserv = '03'x      /* Communication Services */
** id_u_context  = '04'x      /* Application Context */
** id_u_userid   = '05'x      /* User ID */
** id_u_reason   = '06'x      /* Reason Code */
** id_u_idauth   = '07'x      /* Identification/Authorization */
** id_u_remuinst = '08'x      /* Remote User Instance */
** id_u_regtype  = '09'x      /* Registration Type */
** id_u_station  = '0A'x      /* Station Name */
```

```
**  id_u_tsap    - '0B'x      /* TSAP */
**  id_u_ssap    - '0C'x      /* SSAP */
**  id_u_nsap    - '0D'x      /* NSAP */
**
**  U_CONNECT.request UIDU Encoding
**
**     Fixed part of the header
**         uidu_id    - UIDU Type
**         hdr_lgth   - Length of rest of UIDU Header (minus user data)
**         conn       - Connection Number
**         reqid      - Request ID
**     Variable part of the header
**         locuname   - Local User Name
**         remuname   - Remote User Name
**         commserv   - Communication Services
**         context    - Application Context
**         userid     - User ID
**         idauth     - Identification/Authorization
**         remuinst   - Remote User Instance
**         tsap       - TSAP
**         ssap       - SSAP
**         nsap       - NSAP
**     User data part
**         userdata   - User Data
**
**  U_CONNECT.indication UIDU Encoding
**
**     Fixed part of the header
**         uidu_id    - UIDU Type
**         hdr_lgth   - Length of rest of UIDU Header (minus user data)
**         conn       - Connection Number
**         reqid      - Request ID
**     Variable part of the header
**         locuname   - Local User Name
**         remuname   - Remote User Name
**         context    - Application Context
**         userid     - User ID
**         idauth     - Identification/Authorization
**     User data part
**         userdata   - User Data
**
**  U_CONNECT.response UIDU Encoding
**
**     Fixed part of the header
**         uidu_id    - UIDU Type
**         hdr_lgth   - Length of rest of UIDU Header (minus user data)
**         conn       - Connection Number
**         reqid      - Request ID
**     Variable part of the header
**         locuname   - Local User Name
```

```
**        context   - Application Context
**        reason    - Reason Code
**    User data part
**        userdata  - User Data
**
** U_CONNECT.confirm UIDU Encoding
**
**    Fixed part of the header
**        uidu_id   - UIDU Type
**        hdr_lgth  - Length of rest of UIDU Header (minus user data)
**        conn      - Connection Number
**        reqid     - Request ID
**    Variable part of the header
**        userid    - User ID
**        remuname  - Remote User Name
**        context   - Application Context
**        remuinst  - Remote User Instance
**        reason    - Reason Code
**    User data part
**        userdata  - User Data
**
** U_DATA.request UIDU Encoding
**
**    Fixed part of the header
**        uidu_id   - UIDU Type
**        hdr_lgth  - Length of rest of UIDU Header (minus user data)
**        conn      - Connection Number
**        reqid     - Request ID
**    Variable part of the header
**        "none"
**    User data part
**        userdata  - User Data
**
** U_DATA.indication UIDU Encoding
**
**    Fixed part of the header
**        uidu_id   - UIDU Type
**        hdr_lgth  - Length of rest of UIDU Header (minus user data)
**        conn      - Connection Number
**        reqid     - Request ID
**    Variable part of the header
**        "none"
**    User data part
**        userdata  - User Data
**
** U_PART_DATA.request UIDU Encoding
**
**    Fixed part of the header
**        uidu_id   - UIDU Type
**        hdr_lgth  - Length of rest of UIDU Header (minus user data)
```

```
**      conn      - Connection Number
**      reqid     - Request ID
**    Variable part of the header
**      "none"
**    User data part
**      userdata  - User Data
**
** U_PART_DATA.indication UIDU Encoding
**
**    Fixed part of the header
**      uidu_id   - UIDU Type
**      hdr_lgth  - Length of rest of UIDU Header (minus user data)
**      conn      - Connection Number
**      reqid     - Request ID
**    Variable part of the header
**      "none"
**    User data part
**      userdata  - User Data
**
** U_RELEASE.request UIDU Encoding
**
**    Fixed part of the header
**      uidu_id   - UIDU Type
**      hdr_lgth  - Length of rest of UIDU Header (minus user data)
**      conn      - Connection Number
**      reqid     - Request ID
**    Variable part of the header
**      "none"
**    User data part
**      userdata  - User Data
**
** U_RELEASE.indication UIDU Encoding
**
**    Fixed part of the header
**      uidu_id   - UIDU Type
**      hdr_lgth  - Length of rest of UIDU Header (minus user data)
**      conn      - Connection Number
**      reqid     - Request ID
**    Variable part of the header
**      "none"
**    User data part
**      userdata  - User Data
**
** U_RELEASE.response UIDU Encoding
**
**    Fixed part of the header
**      uidu_id   - UIDU Type
**      hdr_lgth  - Length of rest of UIDU Header (minus user data)
**      conn      - Connection Number
**      reqid     - Request ID
```

```
**      Variable part of the header
**          "none"
**      User data part
**          userdata  - User Data
**
** U_RELEASE.confirm UIDU Encoding
**
**      Fixed part of the header
**          uidu_id   - UIDU Type
**          hdr_lgth  - Length of rest of UIDU Header (minus user data)
**          conn      - Connection Number
**          reqid     - Request ID
**      Variable part of the header
**          "none"
**      User data part
**          userdata  - User Data
**
** U_ABORT.request UIDU Encoding
**
**      Fixed part of the header
**          uidu_id   - UIDU Type
**          hdr_lgth  - Length of rest of UIDU Header (minus user data)
**          conn      - Connection Number
**          reqid     - Request ID
**      Variable part of the header
**          userid    - User ID
**          reason    - Reason Code
**      User data part
**          userdata  - User Data
**
** U_ABORT.indication UIDU Encoding
**
**      Fixed part of the header
**          uidu_id   - UIDU Type
**          hdr_lgth  - Length of rest of UIDU Header (minus user data)
**          conn      - Connection Number
**          reqid     - Request ID
**      Variable part of the header
**          userid    - User ID
**          reason    - Reason Code
**      User data part
**          userdata  - User Data
**
** U_PABORT.indication UIDU Encoding
**
**      Fixed part of the header
**          uidu_id   - UIDU Type
**          hdr_lgth  - Length of rest of UIDU Header (minus user data)
**          conn      - Connection Number
```

```
**         reqid     - Request ID
**     Variable part of the header
**         userid    - User ID
**         reason    - Reason Code
**     User data part
**         "none"
**
** U_ERROR.indication UIDU Encoding
**
**     Fixed part of the header
**         uidu_id   - UIDU Type
**         hdr_lgth  - Length of rest of UIDU Header (minus user data)
**         conn      - Connection Number
**         reqid     - Request ID
**     Variable part of the header
**         reason    - Reason Code
**     User data part
**         "none"
**
** U_REGISTER.request UIDU Encoding
**
**     Fixed part of the header
**         uidu_id   - UIDU Type
**         hdr_lgth  - Length of rest of UIDU Header (minus user data)
**         conn      - Connection Number
**         reqid     - Request ID
**     Variable part of the header
**         locuname  - Local User Name
**         commserv  - Communication Services
**         regtype   - Registration Type
**         station   - Station Name
**         tsap      - TSAP
**         ssap      - SSAP
**     User data part
**         "none"
**
** U_REGISTER.confirm UIDU Encoding
**
**     Fixed part of the header
**         uidu_id   - UIDU Type
**         hdr_lgth  - Length of rest of UIDU Header (minus user data)
**         conn      - Connection Number
**         reqid     - Request ID
**     Variable part of the header
**         userid    - User ID
**         reason    - Reason Code
**     User data part
**         "none"
**
** U_DEREGISTER.request UIDU Encoding
**
```

```
**      Fixed part of the header
**          uidu_id    - UIDU Type
**          hdr_lgth   - Length of rest of UIDU Header (minus user data)
**          conn       - Connection Number
**          reqid      - Request ID
**      Variable part of the header
**          userid     - User ID
**          regtype    - Registration Type
**          station    - Station Name
**      User data part
**          "none"
**
**
** U_DEREGISTER.confirm UIDU Encoding
**
**      Fixed part of the header
**          uidu_id    - UIDU Type
**          hdr_lgth   - Length of rest of UIDU Header (minus user data)
**          conn       - Connection Number
**          reqid      - Request ID
**      Variable part of the header
**          reason     - Reason Code
**      User data part
**          "none"
**
*/

/*******************************************************************/
/**********   DECODE UIDU   ****************************************/
/*******************************************************************/
/*
** THIS ROUTINE DECODES A UIDU INTO ITS COMPONENT PARTS.
**
** VARIABLES USED AS INPUT BY THIS ROUTINE
**      UIDUTRX - THE UIDU TRANSACTION
**
** VARIABLES SET AS OUTPUT BY THIS ROUTINE
**      UIDU_ID  - UIDU TYPE CODE
**      CONN     - MAP CONNECTION NUMBER
**      REQID    - REQUEST ID
**      REMUNAME - REMOTE USER NAME
**      LOCUNAME - LOCAL USER NAME
**      COMMSERV - COMMUNICATION SERVICES
**      CONTEXT  - APPLICATION CONTEXT
**      USERID   - USER ID
**      REASON   - REASON CODE
**      IDAUTH   - IDENTIFICATION/AUTHORIZATION
**      REMUINST - REMOTE USER INSTANCE
**      REGTYPE  - REGISTRATION TYPE
**      STATION  - STATION NAME
**      TSAP     - TSAP
```

```
**      SSAP     - SSAP
**      NSAP     - NSAP
**      USERDATA - USER DATA
*/
DECODE_UIDU
   {
   PARSE VAR UIDUTRX 1 UIDU_ID 2 UIDU_HDR_LGTH 4 CONN 6 REQID 7 UIDU_REST;
   VERIFY UIDU_ID;
   SET ALL PARAMETERS TO NULL;
   SET UIDU_LGTH = LENGTH(UIDUTRX);
   SET UIDU_REM_LGTH = C2D(UIDU_HDR_LGTH) - 3;
   WHILE (UIDU_REM_LGTH > 0)
      {
      PARSE VAR UIDU_REST 1 WRK_ID +1 WRK_LGTH +1 UIDU_REST;
      SET WRK_LGTH = C2D(WRK_LGTH);
      IF (WRK_ID == ID_U_REMUNAME);
         {
         SET REMUNAME = SUBSTR(UIDU_REST,1,WRK_LGTH);
         SET UIDU_REST = SUBSTR(UIDU_REST,WRK_LGTH+1);
         SET UIDU_REM_LGTH = UIDU_REM_LGTH - WRK_LGTH -2;
         }
      ELSE IF (WRK_ID == ID_U_LOCUNAME)
         {
         SET LOCUNAME = SUBSTR(UIDU_REST,1,WRK_LGTH);
         SET UIDU_REST = SUBSTR(UIDU_REST,WRK_LGTH+1);
         SET UIDU_REM_LGTH = UIDU_REM_LGTH - WRK_LGTH -2;
         }
      ELSE IF (WRK_ID == ID_U_COMMSERV)
         {
         SET COMMSERV = SUBSTR(UIDU_REST,1,WRK_LGTH);
         SET UIDU_REST = SUBSTR(UIDU_REST,WRK_LGTH+1);
         SET UIDU_REM_LGTH = UIDU_REM_LGTH - WRK_LGTH -2;
         }
      ELSE IF (WRK_ID == ID_U_CONTEXT)
         {
         SET CONTEXT = SUBSTR(UIDU_REST,1,WRK_LGTH);
         SET UIDU_REST = SUBSTR(UIDU_REST,WRK_LGTH+1);
         SET UIDU_REM_LGTH = UIDU_REM_LGTH - WRK_LGTH -2;
         }
      ELSE IF (WRK_ID == ID_U_USERID)
         {
         SET USERID = SUBSTR(UIDU_REST,1,WRK_LGTH);
         SET UIDU_REST = SUBSTR(UIDU_REST,WRK_LGTH+1);
         SET UIDU_REM_LGTH = UIDU_REM_LGTH - WRK_LGTH -2;
         }
      ELSE IF (WRK_ID == ID_U_REASON)
         {
         SET REASON = SUBSTR(UIDU_REST,1,WRK_LGTH);
         SET UIDU_REST = SUBSTR(UIDU_REST,WRK_LGTH+1);
         SET UIDU_REM_LGTH = UIDU_REM_LGTH - WRK_LGTH -2;
         }
```

```
    ELSE IF (WRK_ID == ID_U_IDAUTH)
       {
       SET IDAUTH = SUBSTR(UIDU_REST,1,WRK_LGTH);
       SET UIDU_REST = SUBSTR(UIDU_REST,WRK_LGTH+1);
       SET UIDU_REM_LGTH = UIDU_REM_LGTH - WRK_LGTH -2;
       }
    ELSE IF (WRK_ID == ID_U_REMUINST)
       {
       SET REMUINST = SUBSTR(UIDU_REST,1,WRK_LGTH);
       SET UIDU_REST = SUBSTR(UIDU_REST,WRK_LGTH+1);
       SET UIDU_REM_LGTH = UIDU_REM_LGTH - WRK_LGTH -2;
       }
    ELSE IF (WRK_ID == ID_U_REGTYPE)
       {
       SET REGTYPE = SUBSTR(UIDU_REST,1,WRK_LGTH);
       SET UIDU_REST = SUBSTR(UIDU_REST,WRK_LGTH+1);
       SET UIDU_REM_LGTH = UIDU_REM_LGTH - WRK_LGTH -2;
       }
    ELSE IF (WRK_ID == ID_U_STATION)
       {
       SET STATION = SUBSTR(UIDU_REST,1,WRK_LGTH);
       SET UIDU_REST = SUBSTR(UIDU_REST,WRK_LGTH+1);
       SET UIDU_REM_LGTH = UIDU_REM_LGTH - WRK_LGTH -2;
       }
    ELSE IF (WRK_ID == ID_U_TSAP)
       {
       SET TSAP = SUBSTR(UIDU_REST,1,WRK_LGTH);
       SET UIDU_REST = SUBSTR(UIDU_REST,WRK_LGTH+1);
       SET UIDU_REM_LGTH = UIDU_REM_LGTH - WRK_LGTH -2;
       }
    ELSE IF (WRK_ID == ID_U_SSAP)
       {
       SET SSAP = SUBSTR(UIDU_REST,1,WRK_LGTH);
       SET UIDU_REST = SUBSTR(UIDU_REST,WRK_LGTH+1);
       SET UIDU_REM_LGTH = UIDU_REM_LGTH - WRK_LGTH -2;
       }
    ELSE IF (WRK_ID == ID_U_NSAP)
       {
       SET NSAP = SUBSTR(UIDU_REST,1,WRK_LGTH);
       SET UIDU_REST = SUBSTR(UIDU_REST,WRK_LGTH+1);
       SET UIDU_REM_LGTH = UIDU_REM_LGTH - WRK_LGTH -2;
       }
    ELSE RETURN(ERROR);
    }
IF (LENGTH(UIDU_REST) > 0)
   SET USERDATA = UIDU_REST;
ELSE
   SET USERDATA = NULL;
RETURN;
}
```

```
/****************************************************************/
/********** BUILD UIDU ******************************************/
/****************************************************************/
/*
** THIS ROUTINE BUILDS A UIDU FROM ITS COMPONENT PARTS.
**
** VARIABLES USED AS INPUT BY THIS ROUTINE
**     UIDU_ID  - UIDU TYPE CODE
**     CONN     - MAP CONNECTION NUMBER
**     REQID    - REQUEST ID
**     REMUNAME - REMOTE USER NAME
**     LOCUNAME - LOCAL USER NAME
**     COMMSERV - COMMUNICATION SERVICES
**     CONTEXT  - APPLICATION CONTEXT
**     USERID   - USER ID
**     REASON   - REASON CODE
**     IDAUTH   - IDENTIFICATION/AUTHORIZATION
**     REMUINST - REMOTE USER INSTANCE
**     REGTYPE  - REGISTRATION TYPE
**     STATION  - STATION NAME
**     TSAP     - TSAP
**     SSAP     - SSAP
**     NSAP     - NSAP
**     USERDATA - USER DATA
**
** VARIABLES SET AS OUTPUT BY THIS ROUTINE
**     UIDUTRX - THE UIDU TRANSACTION
*/
BUILD_UIDU
   {
   /*
   ** FORMAT INDIVIDUAL PARAMETERS
   */
   IF (LENGTH(CONN) = 1)                    /* CONNECTION NUMBER */
      SET CONN = '00'X::CONN;
   IF (REMUNAME IS PRESENT)                 /* REMOTE USER NAME */
      SET X1 = ID_U_REMUNAME::D2C(LENGTH(REMUNAME))::REMUNAME;
   ELSE SET X1 = NULL;
   IF (LOCUNAME IS PRESENT)                 /* LOCAL USER NAME */
      SET X2 = ID_U_LOCUNAME::D2C(LENGTH(LOCUNAME))::LOCUNAME;
   ELSE SET X2 = NULL;
   IF (COMMSERV IS PRESENT)                 /* COMMUNICATION SERVICES */
      SET X3 = ID_U_COMMSERV::D2C(LENGTH(COMMSERV))::COMMSERV;
   ELSE SET X3 = NULL;
   IF (CONTEXT IS PRESENT)                  /* APPLICATION CONTEXT */
      SET X4 = ID_U_CONTEXT::D2C(LENGTH(CONTEXT))::CONTEXT;
   ELSE SET X4 = NULL;
   IF (USERID IS PRESENT)                   /* USER ID */
      {
      SET USERID = MAPCH2HX(USERID,'CONVERT');
```

```
      IF (LENGTH(USERID) = 1)
         SET USERID = '00'X::USERID;
      SET X5 = ID_U_USERID::D2C(LENGTH(USERID))::USERID;
      }
ELSE SET X5 = NULL;
IF (REASON IS PRESENT)              /* REASON CODE */
      {
      SET REASON = D2C(REASON)
      IF (LENGTH(REASON) = 1)
         SET REASON = '00'X::REASON;
      IF (LENGTH(REASON) = 3)
         SET REASON = '00'X::REASON;
      SET X6 = ID_U_REASON::D2C(LENGTH(REASON))::REASON;
      }
      ELSE SET X6 = NULL;
      IF (IDAUTH IS PRESENT)            /* IDENTIFICATION/AUTHORIZATION */
         SET X7 = ID_U_IDAUTH::D2C(LENGTH(IDAUTH))::IDAUTH;
      ELSE SET X7 = NULL;
      IF (REMUINST IS PRESENT)          /* REMOTE USER INSTANCE */
         {
         SET REMUINST = D2C(REMUINST)
         WHILE (LENGTH(REMUINST) < 4)
            {
            SET REMUINST = '00'X::REMUINST;
            }
         SET X8 = ID_U_REMUINST::D2C(LENGTH(REMUINST))::REMUINST;
         }
      ELSE SET X8 = NULL;
      IF (REGTYPE IS PRESENT)           /* REGISTRATION TYPE */
         {
         SET REGTYPE = MAPCH2HX(REGTYPE,'CONVERT');
         SET X9 = ID_U_REGTYPE::D2C(LENGTH(REGTYPE))::REGTYPE;
         }
      ELSE SET X9 = NULL;
      IF (STATION IS PRESENT)           /* STATION NAME */
         SET X10 = ID_U_STATION::D2C(LENGTH(STATION))::STATION;
      ELSE SET X10 = NULL;
      IF (TSAP IS PRESENT)              /* TSAP */
         {
         SET TSAP = MAPCH2HX(TSAP,'CONVERT');
         SET X11 = ID_U_TSAP::D2C(LENGTH(TSAP))::TSAP;
         }
      ELSE SET X11 = NULL;
      IF (SSAP IS PRESENT)              /* SSAP */
         {
         SET SSAP = MAPCH2HX(SSAP,'CONVERT');
         SET X12 = ID_U_SSAP::D2C(LENGTH(SSAP))::SSAP;
         }
      ELSE SET X12 = NULL;
      IF (NSAP IS PRESENT)              /* NSAP */
         {
```

```
      SET NSAP = MAPCH2HX(NSAP,'CONVERT');
      SET X13 = ID_U_NSAP||D2C(LENGTH(NSAP))||NSAP;
      }
ELSE SET X13 = NULL;
IF (USERDATA IS PRESENT)        /* USER DATA */
   SET X14 = USERDATA;
ELSE SET X14 = NULL;
/*
** BUILD THE UIDU
*/
IF (UIDU_ID == ID_U_CONNECT_IND)      /* U_CONNECT.INDICATION */
   {
   SET HDRLGTH = 3 + LENGTH(X2) + LENGTH(X1) + LENGTH(X4);
   SET HDRLGTH = HDRLGTH + LENGTH(X5) + LENGTH(X7)
   SET HDRLGTH = D2C(HDRLGTH);
   IF (LENGTH(HDRLGTH) = 1)
      SET HDRLGTH = '00'X||HDRLGTH;
   SET XHDR = UIDU_ID||HDRLGTH||CONN||REQID;
   SET UIDUTRX = XHDR||X2||X1||X4||X5||X7||X14;
   RETURN;
   }
ELSE IF (UIDU_ID == ID_U_CONNECT_CONF)   /* U_CONNECT.CONFIRM */
   {
   SET HDRLGTH = 3 + LENGTH(X5) + LENGTH(X1) + LENGTH(X4)
   SET HDRLGTH = HDRLGTH + LENGTH(X6) + LENGTH(X8)
   SET HDRLGTH = D2C(HDRLGTH);
   IF (LENGTH(HDRLGTH) = 1)
      SET HDRLGTH = '00'X||HDRLGTH;
   SET XHDR = UIDU_ID||HDRLGTH||CONN||REQID;
   SET UIDUTRX = XHDR||X5||X1||X4||X8||X6||X14;
   RETURN;
   }
ELSE IF (UIDU_ID == ID_U_DATA_IND)      /* U_DATA.INDICATION */
   {
   SET HDRLGTH = 3;
   SET HDRLGTH = D2C(HDRLGTH);
   IF (LENGTH(HDRLGTH) = 1)
      SET HDRLGTH = '00'X||HDRLGTH;
   SET XHDR = UIDU_ID||HDRLGTH||CONN||REQID;
   SET UIDUTRX = XHDR||X14;
   RETURN;
   }
ELSE IF (UIDU_ID == ID_U_PART_DATA_IND) /* U_PART_DATA.INDICATION */
   {
   SET HDRLGTH = 3;
   SET HDRLGTH = D2C(HDRLGTH);
   IF (LENGTH(HDRLGTH) = 1)
      SET HDRLGTH = '00'X||HDRLGTH;
   SET XHDR = UIDU_ID||HDRLGTH||CONN||REQID;
   SET UIDUTRX = XHDR||X14;
```

```
    RETURN;
    }
ELSE IF (UIDU_ID == ID_U_RELEASE_IND)   /* U_RELEASE.INDICATION */
    {
    SET HDRLGTH = 3;
    SET HDRLGTH = D2C(HDRLGTH);
    IF (LENGTH(HDRLGTH) = 1)
       SET HDRLGTH = '00'X||HDRLGTH;
    SET XHDR = UIDU_ID||HDRLGTH||CONN||REQID;
    SET UIDUTRX = XHDR||X14;
    RETURN;
    }
ELSE IF (UIDU_ID == ID_U_RELEASE_CONF)   /* U_RELEASE.CONFIRM */
    {
    SET HDRLGTH = 3;
    SET HDRLGTH = D2C(HDRLGTH);
    IF (LENGTH(HDRLGTH) = 1)
       SET HDRLGTH = '00'X||HDRLGTH;
    SET XHDR = UIDU_ID||HDRLGTH||CONN||REQID;
    SET UIDUTRX = XHDR||X14;
    RETURN;
    }
ELSE IF (UIDU_ID == ID_U_ABORT_IND)      /* U_ABORT.INDICATION */
    {
    SET HDRLGTH = 3 + LENGTH(X5) + LENGTH(X6);
    SET HDRLGTH = D2C(HDRLGTH);
    IF (LENGTH(HDRLGTH) = 1)
       SET HDRLGTH = '00'X||HDRLGTH;
    SET XHDR = UIDU_ID||HDRLGTH||CONN||REQID;
    SET UIDUTRX = XHDR||X5||X6||X14;
    RETURN;
    }
ELSE IF (UIDU_ID == ID_U_PABORT_IND)     /* U_PABORT.INDICATION */
    {
    SET HDRLGTH = 3 + LENGTH(X5) + LENGTH(X6);
    SET HDRLGTH = D2C(HDRLGTH);
    IF (LENGTH(HDRLGTH) = 1)
       SET HDRLGTH = '00'X||HDRLGTH;
    SET XHDR = UIDU_ID||HDRLGTH||CONN||REQID;
    SET UIDUTRX = XHDR||X5||X6||X14;
    RETURN;
    }
ELSE IF (UIDU_ID == ID_ERROR_IND)        /* U_ERROR.INDICATION */
    {
    SET HDRLGTH = 3 + LENGTH(X6);
    SET HDRLGTH = D2C(HDRLGTH);
    IF (LENGTH(HDRLGTH) = 1)
       SET HDRLGTH = '00'X||HDRLGTH;
    SET XHDR = UIDU_ID||HDRLGTH||CONN||REQID;
    SET UIDUTRX = XHDR||X6||X14;
    RETURN;
```

```
}
SE IF (UIDU_ID == ID_U_REGISTER_CONF) /* U_REGISTER.CONFIRM */
{
SET HDRLGTH = 3 + LENGTH(X5) + LENGTH(X6);
SET HDRLGTH = D2C(HDRLGTH);
IF (LENGTH(HDRLGTH) = 1)
    SET HDRLGTH = '00'X!!HDRLGTH;
SET XHDR = UIDU_ID!!HDRLGTH!!CONN!!REQID;
SET UIDUTRX = XHDR!!X5!!X6;
RETURN;
}
SE IF (UIDU_ID == ID_U_DEREGISTER_CONF) /* U_DEREGISTER.CONFIRM */
{
SET HDRLGTH = 3;
SET HDRLGTH = D2C(HDRLGTH);
IF (LENGTH(HDRLGTH) = 1)
    SET HDRLGTH = '00'X!!HDRLGTH;
SET XHDR = UIDU_ID!!HDRLGTH!!CONN!!REQID;
SET UIDUTRX = XHDR;
    RETURN;
    }
ELSE RETURN(ERROR);                 /* INVALID UIDU TYPE */
}
```

Function Description

Figure 1:
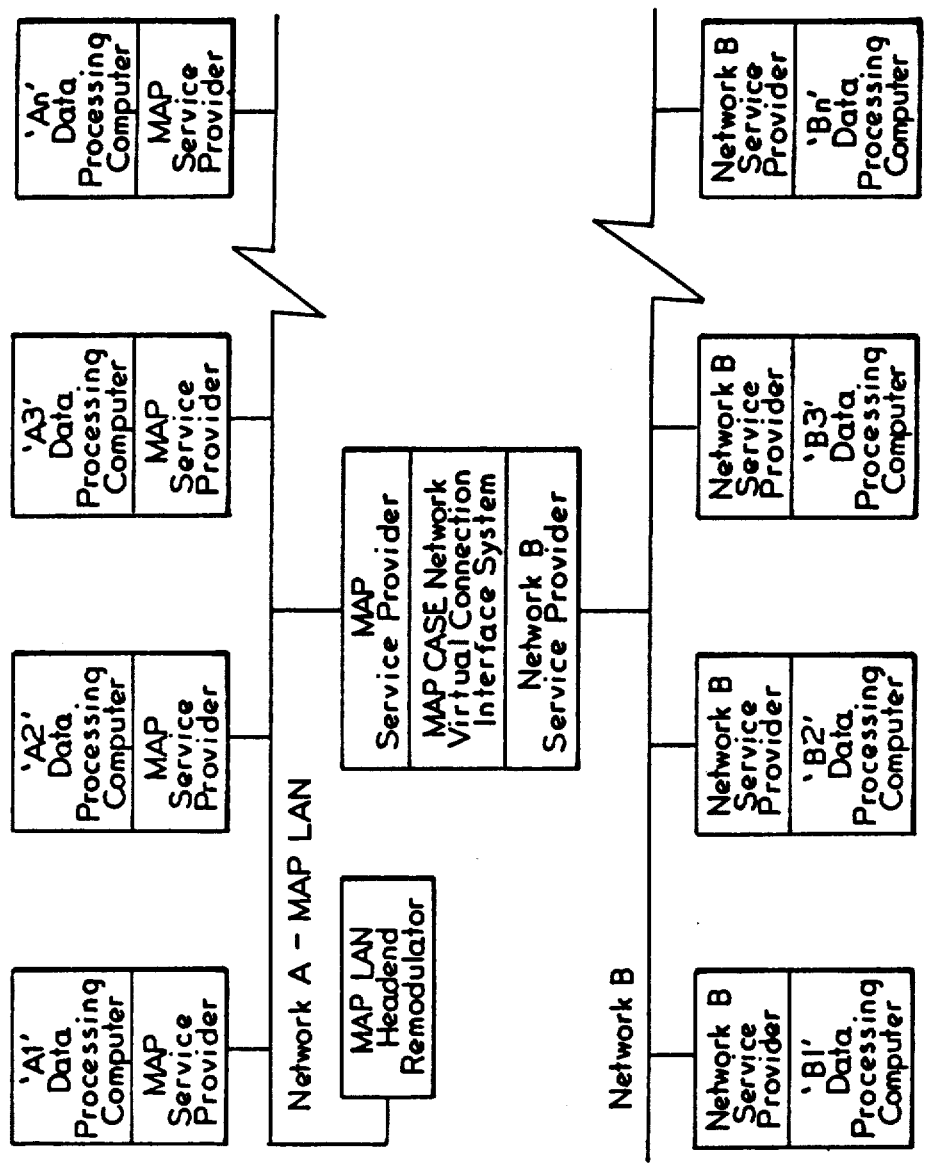
FIG. 1 is a block diagram illustrating an arrangement and connections of a MAP CASE Network Virtual Connection Interface System between two different networks for operating in accordance with the principles of the present invention.

Referring now to FIG. 1 of the drawings, a first network of data processing computers is identified as Network A, each one of the data processing computers being identified by a letter and subscript, such as $A_1$, $A_2$, and $A_N$. A second network, identified as Network B, each one of the data processing computers being identified by a letter and subscript, such as $B_1$, $B_2$, and $B_N$. The use of the letter "N" in both networks is to indicate that any number of individual computers is included in either network.

Each data processing computer in Network A includes a logical component labelled "MAP Service Provider". This logical component is composed of any number of physical components so as to provide all the MAP CASE network services as defined by the MAP CASE specification.

Embodied within the circuit identified as "MAP LAN Headend Remodulator" is a MAP network component which receives electronic signals from transmitting "MAP Service Providers", and transmits the corresponding electronic signals to receiving "MAP Service Providers". Such hardware is well know and is termed "standard equipment".

Each data processing computer in Network B includes a logical component labelled "Network B Service Provider". This logical component is composed of any number of physical components so as to provide all necessary network B services. Network B may be any non-MAP connection-oriented network regardless of electronic signalling technique and protocol employed.

Figure 2:
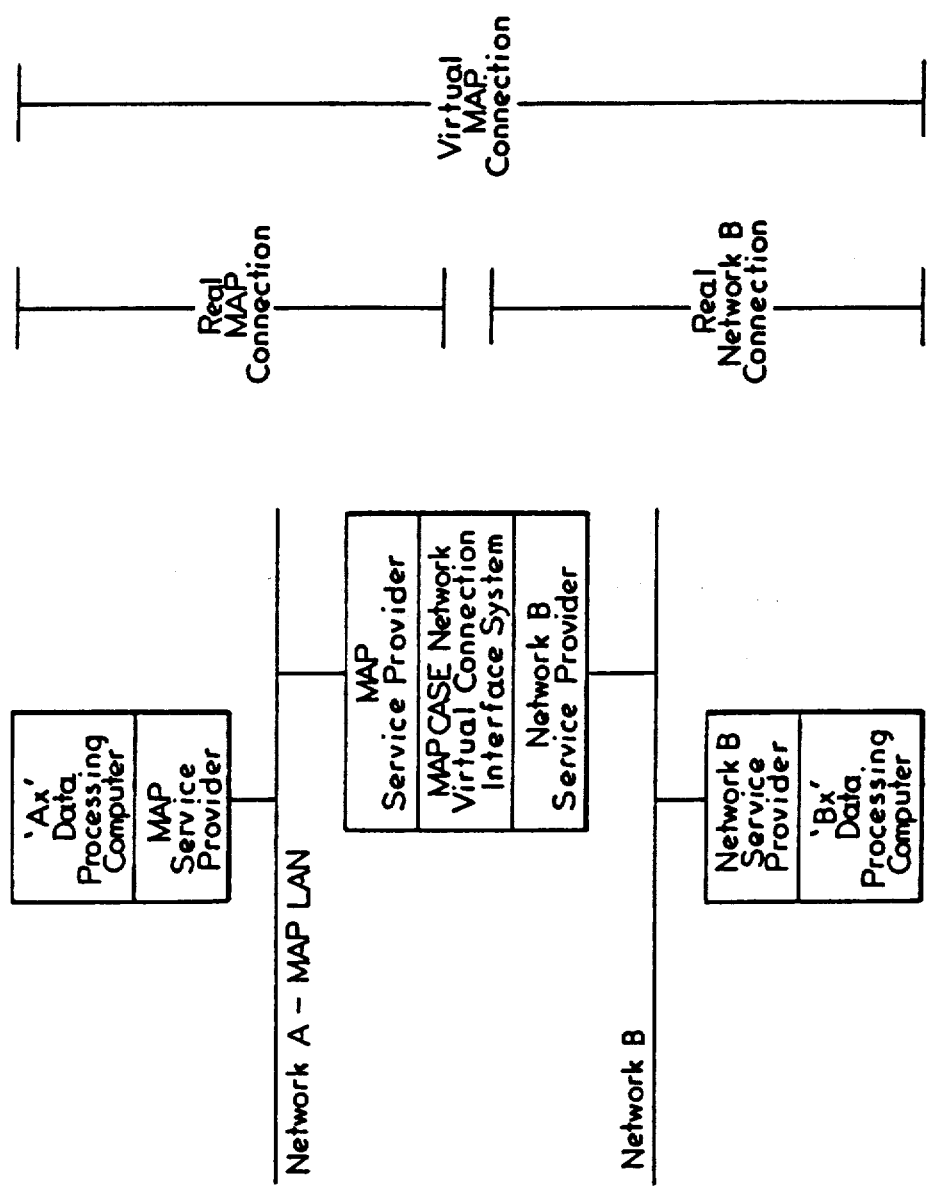
FIG. 2 is a block diagram illustrating the relationship between a real MAP CASE connection on Network A, a real non-MAP connection-oriented network connection on Network B, and a Virtual MAP CASE Connection established across Networks A and B.

The MAP CASE Network Virtual Connection Interface System includes both a "MAP Service Provider" and a "Network B Service Provider". For Network A, this "MAP Service Provider" is used to establish the "real MAP Connection" as depicted in FIG. 2. In the case of Network B, the "Network B Service Provider" is used to establish the "real Network B connection", also depicted in FIG. 2.

In accordance with the present invention, the MAP CASE Network Virtual Connection Interface System functions to permit any appropriately identified MAP CASE user program running in a data processing computer attached to either network A or B to communicate with any appropriately identified MAP CASE user program running in a data processing computer attached to the other network. Moreover, a MAP CASE Network Virtual Connection Interface System that functions in accordance with the invention will function between a network that is operating using the Manufacturing Automation Protocol and individual data processing computers in a connection-oriented non-MAP CASE network.

Therefore, a detailed description of the MAP CASE Network Virtual Connection Interface System will follow.

Briefly, the MAP CASE Network Virtual Connection Interface System is any data processor circuit that is adapted to function in a manner that is illustrated in FIG. 3 of the drawings. To describe this in more detail, each of the "notes" in FIG. 3C should be reviewed, digested and understood thoroughly. Then, likewise for the Legends presented in FIG. 3C. Next, an actual example of the use of the State Table of FIG. 3 will best illustrate its operation.

The example is described as follows:

A user program, identified as $B_{apx}$, running in data processing computer $B_x$ attached to Network B (a non-MAP network) requires a data transfer to another user program, identified as $A_{apy}$, running in data processing computer $A_y$ attached to network A (a MAP network). First, each of the user programs must identify itself as an active MAP CASE program to the MAP Virtual network. Then, in accordance with the MAP CASE specification, a CASE Connection (Association) must be established between the two user programs.

The data transfer phase is entered, then, and all the appropriate data is transferred across the MAP CASE virtual connection. When no more data remains to be transferred, the user program, $B_{apx}$, at its option, may release (terminate) the connection between it and the program, $A_{apy}$.

Figures 4, 4A:
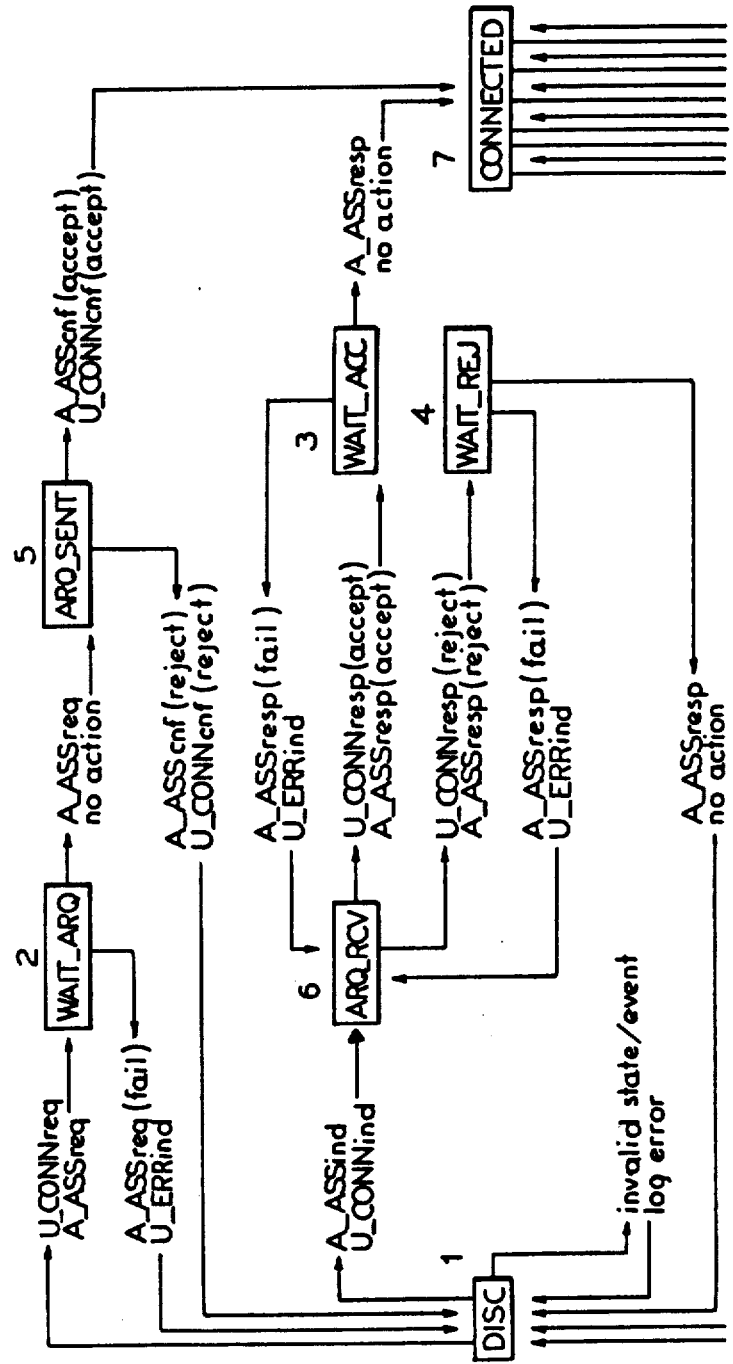
FIG. 4 consists of FIG. 4A and FIG. 4B and shows a state diagram chart illustrating transitions from a Connected state to a Disconnected state and from a Disconnected state to a Connected state. This state diagram chart is a representation of the tabular data in FIG. 3.

The process of identifying user programs as active MAP CASE programs to the MAP network is distinct and separate from establishing a MAP CASE connection. Except that this identification process, hereafter termed "registration", must precede the connection request, there is no direct functional relationship between the states of a Virtual MAP connection and a program registration. FIG. 4 specifically depicts the states and state transitions pertaining to the Virtual MAP connection. Accordingly, the Registration states are not shown.

Registration Process

The user program, $A_{apy}$, registers with the MAP network in accordance with whatever specific conventions are presented by the MAP Service Provider that is associated with the corresponding data processing computer.

The user program, $B_{apx}$, registers with the MAP network by sending a "U_REGreq" transaction to the Network B Service Provider in the MAP CASE Network Virtual MAP Connection Interface System. The "U_REGreq" translates into "user register request". Referring to the State Table of FIG. 3A, in the first column with the heading "Input Transaction", looking down the column to find "U_REGreq" (the first item down), follow the line across to column 1 under the "Registration Table Entry" heading which reveals the code "BL 2".

FIG. 3C presents the code designation and identifies, under the heading "Action Codes", the "B" indicates "Build a new table entry", in this case a Registration table entry, and "L" indicates "Build state sensitive transaction and send it to the MAP Network Service Provider". The "2" indicates that a transition is made to Registration state "2", "Waiting for Registration Request status from MAP Service Provider". Upon receipt of "successful" status from the MAP Service Provider, the user program, $B_{apx}$, is known as an active MAP CASE application program.

CONNECTION PROCESS

Referring to FIG. 4 and more particularly to FIG. 4A, beginning with the "Disconnected" state, indicated by a legend "DISC" in a block 1, for an input of "U_CONNreq", the output will be "A_ASSreq" and will transfer to action state 2, which is a "WAIT_ARQ" condition.

A translation of these transaction designations is as follows: "U_CONNreq" can be read, "User connect request", which produces an output of "A_ASSreq" which can be read, "Application Associate request" to change the action state to "WAIT_ARQ" which can be read, "Waiting for Associate.request request status from MAP Service Provider".

Referring now to the State Table of FIG. 3 and more particularly to FIG. 3A, in the first column with the heading "Input Transaction", looking down the column to find "U_CONNreq" (the third item down), following this line across to column 1 under the "Connection Table Entry" heading will reveal the code "BL 2". FIG. 3C presents the code designations and identifies, under the heading "Action Codes" that "B" indicates "Build a new table entry", in this case a Connection table entry, and "L" indicates "Build state sensitive transaction and sent it to the MAP network Service Provider" (meaning send to the other network). The "2" indicates that the resulting state transition is to action state "2", "Waiting for Associate.request request status from MAP Service Provider". In other words, another input is needed to move to another action state.

Therefore, according to the State Table of FIG. 3A, looking down the first column until "A_ASSOCreq" is found, and then, following this line across to column 2 (because it was to the action state 2 that the state transition was made previously) the indication "N 5" is revealed. From FIG. 3C it will be seen that "No action" is required, and the transition is made to action state "5".

Following this same reasoning through from the present action state "5", as indicated in FIG. 4A, an input of "A_ASScnf(accept)" produces an output of "U_CONNcnf(accept)" and makes the transition to action state 7, which is the "Connected" state. This is seen by looking at the State Table, the first column, this time it is found in FIG. 3B, which is a continuation of FIG. 3A, to locate "A_ASScnf(a)", the third item from the top of FIG. 3B, and following that line across to reveal in column 5 the indication "H 7", which means (from FIG. 3C) "Build state sensitive transaction and send it to the Network B Service Provider", the "7" meaning transfer to action state "7".

Once the "Connected" state is achieved, it will be maintained until released by the requesting user program or broken off by a positive action by the answering user program. Any interruption of this connection, however, will produce a transaction notifying all parties of the connection release.

Data Transfer Process

Once a connection has been established, the transfer of data may take place. Since it was the user program, $B_{apx}$, in the Network B that requested the data transfer, the program $B_{apx}$ sends a "U_DATAreq" transaction, including the data to be transferred, to the Network B Service Provider in the MAP CASE Network Virtual Connection Interface System. The "U_DATAreq" translates into "user data request".

Referring to the State Table of FIG. 3A, in the first column with the heading "Input Transaction", looking down the column to find "U_datareq" (the fifth item down), then following the line across to column 7 under the "Connection Table Entry" heading, reveals code "L". FIG. 3C identifies this code designation as "Build state sensitive transaction and send it to MAP Network Service Provider". No transition state number is indicated because the system stays in its present state (7).

Release Process

The above detailed description presents the steps to accomplish a "Connected" state. Assume that communications have been completed and all required data has been transferred, to obtain a "Disconnected" state and return to "IDLE", refer to FIG. 4 and more particularly to FIG. 4B. Responsive to an input of "U_RELreq", which is read, "User Release request", an output of "A_RELreq" is achieved to move into action state "8".

Refer to the State Table of FIG. 3A, under the heading "Input Transaction", the seventh item down shows "U_RELSEreq", and follow this line across to column 7 (because that is the present action state) reveals the code "L 8". From FIG. 3C, the code "L" means "Build state sensitive transaction and send it to the MAP Network Service Provider", and the code "8" means transfer to action state 8, identified by a block with a legend "WAIT_RRQ" in FIG. 4B. This legend "WAIT_RRQ" can be read, "Waiting for Release.request request status from the MAP Service Provider".

Figure 4B:
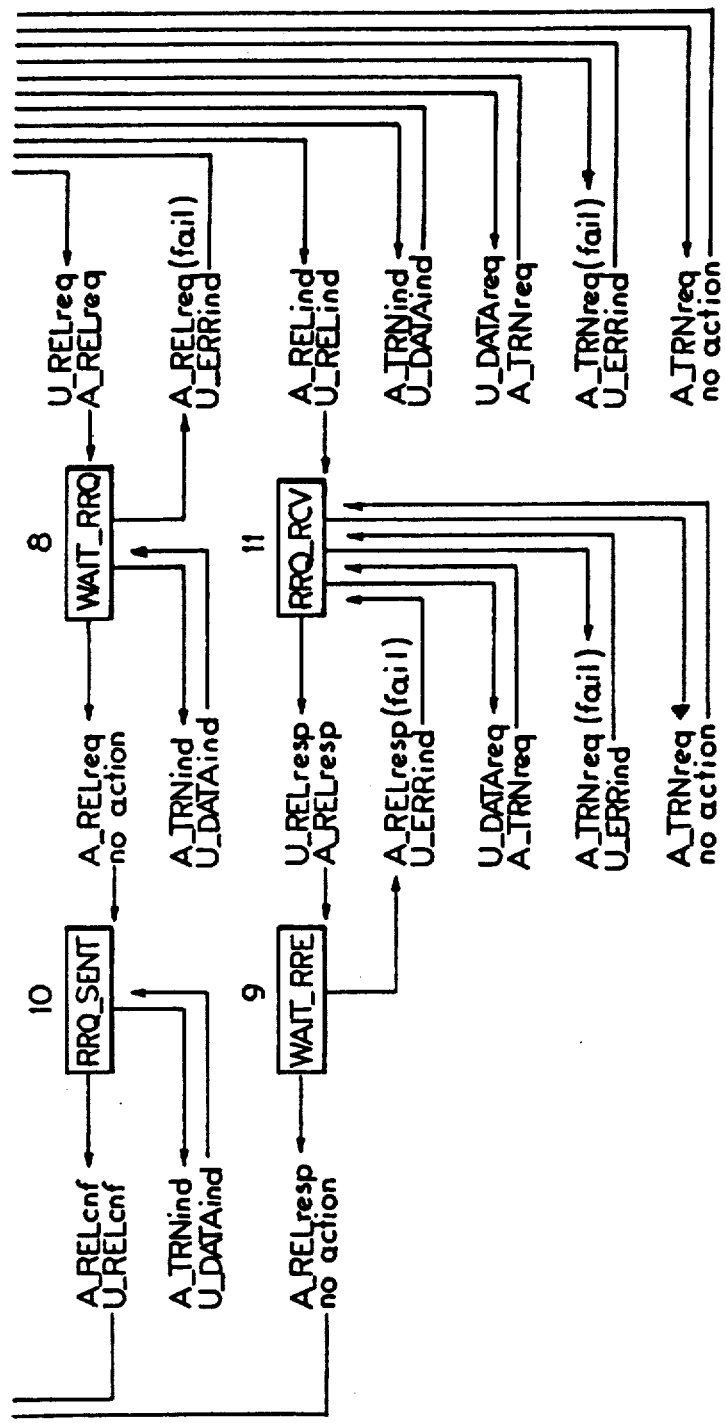

Therefore, from FIG. 4B, it is illustrated that an input of "A_RELreq" requires no further action to transfer to action state 10. This FIG. 4B is an illustration of the information in the State Table of FIG. 3B, particularly line 5. In this FIG. 4B, the state 10 is a block with the legend "RRQ_SENT", which can be read, "Release Request Sent".

Incidentally, while in this "RRQ_SENT" state and a transfer of data signal is received, the result will be a loop back, as illustrated by the input "A_TRNind" on the next line below the block for the action state 10, with an output of "U_DATAind". Such a condition is true also for the state 8, as indicated on the line below the block 8.

Now, from state 10, a "A_RELcnf" input produces an output of "U_RELcnf" which, from the State Table in FIG. 3, confirms a return to the "Disconnected" state.

This now completes a description and explanation of a complete cycle, or sequence, using the technique of the invention, from the initial "IDLE" state, to a "Connected" state and back to the initial "Disconnected", or "IDLE", state. It will be discovered by anyone following the system of the invention that the technique described above is capable of performing any number of connections simultaneously. There may be a limitation in the real world, however, due to hardware capabilities, but theoretically, the technique of the invention is without limitation.

A system that is capable of functioning in accordance with the present invention will have only two logical states for an association between two networks between which it serves as an interface in order to interface dissimilar operating characteristics. Those logical states are simply "Connected" or "Disconnected". Of course, there are intermediate positions of transition, but these are on the way to one or the other of the "Connected" or "Disconnected" logical states.

Figure 5:
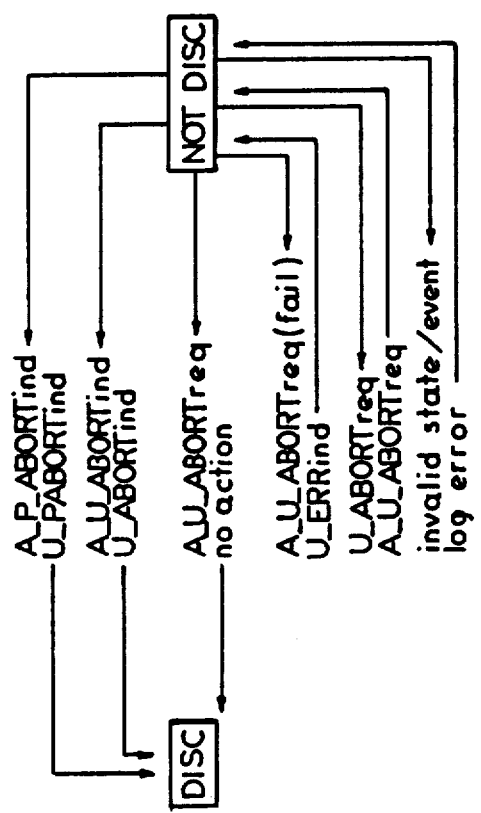
FIG. 5 is a state diagram chart illustrating error transitions from any state to the Disconnected state with particular reference to the State Table of FIG. 3.

FIG. 5 of the drawings illustrates in a state diagram chart how a system that functions in accordance with the invention will toggle between these "Connected" and "Disconnected" states based upon an "error" condition. For example, if the system is "NOT DISCONNECTED", and it receives a "A_P_ABORTind", which can be read, "Association P-Abort indication", as an input, the output will be "U_PABORTind", which can be read, "User P-Abort indication", the state will transition to the "Disconnected" condition. By the term "not disconnected" is meant that the system may be in any condition other than the "Disconnected" state.

While the invention has been described with particularity and has been shown with reference to preferred forms, or embodiments, it will be understood by those skilled in this art that other changes, than those mentioned, can be made. However, it is understood that the scope of the invention is that defined by the appended claims.

We claim:

1. A system for establishing a communication connection for the transfer of information between a real MAP network of data processing computers and a real non-MAP connection-oriented network of data processing computers, wherein each of said data processing computers in each network is a type of electronic digital computing machine that can execute collections of user created instruction programs, and can be connected to a local area network, so that said programs can communicate with other programs in other data processing computers, said system comprising:

each data processing computer in each of said networks being connected to execute predetermined user created data programs;

interface means to establish a Virtual MAP CASE connection path between a computer in said MAP network and a computer in said non-MAP connection-oriented network, in response to a request from either computer, in accordance with a State Table in FIG. 3 of the drawings;

said interface means being adapted to manage information transfer between said computers over said Virtual MAP CASE connection path in accordance with said State Table in FIG. 3 of the drawings;

so that said Virtual MAP CASE connection path presents the appearance of a real MAP connection path for the transfer of said information.

2. A method to permit communication between a network of Manufacturing Automation Protocol (MAP) computers utilizing common application service elements (CASE) and a network of non-MAP connection-oriented computers, wherein each of said computers in each network is a type of electronic digital computing machine that can execute collections of user created instruction programs, and can be connected to a local area network, so that said programs can communicate with other programs in other data processing computers, said method comprising the steps of:

registering a user program, by a user computer, with an interface system for identifying said user program as an active MAP CASE program, in accordance with a State Table in FIG. 3 of the drawings;

establishing a Virtual MAP CASE connection path through said interface system by said user computer, in accordance with said State Table;

transferring data between said user computer in one network and said computer in the other network, in accordance with said State Table, and releasing said connection path, in accordance with said State Table, when communication between said networks is completed;

so that said Virtual MAP CASE connection path presents the appearance of a real MAP connection for the transfer of said data.

* * * * *